United States Patent
Yoshida et al.

(10) Patent No.: US 11,792,336 B2
(45) Date of Patent: Oct. 17, 2023

(54) INFORMATION PROCESSING DEVICE TO BE SUBJECT OF APPLIANCE REGISTRATION IN A MANAGEMENT SERVER, INFORMATION PROCESSING SYSTEM, AND INFORMATION PROCESSING METHOD

(71) Applicants: Eiichiro Yoshida, Kanagawa (JP); Xiaofeng Han, Kanagawa (JP)

(72) Inventors: Eiichiro Yoshida, Kanagawa (JP); Xiaofeng Han, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 49 days.

(21) Appl. No.: 17/022,136

(22) Filed: Sep. 16, 2020

(65) Prior Publication Data

US 2021/0092241 A1 Mar. 25, 2021

(30) Foreign Application Priority Data

Sep. 19, 2019 (JP) ................................ 2019-170938
Nov. 15, 2019 (JP) ................................ 2019-207373

(51) Int. Cl.
- *H04N 1/00* (2006.01)
- *H04N 1/32* (2006.01)
- *H04N 1/44* (2006.01)

(52) U.S. Cl.
CPC ....... *H04N 1/00344* (2013.01); *H04N 1/0097* (2013.01); *H04N 1/00244* (2013.01);
(Continued)

(58) Field of Classification Search
None
See application file for complete search history.

(56) References Cited

U.S. PATENT DOCUMENTS

2004/0046972 A1* 3/2004 Shibao ............... H04N 1/00832
358/1.14
2008/0229327 A1 9/2008 Yoshida
(Continued)

FOREIGN PATENT DOCUMENTS

| JP | 2012-203430 | 10/2012 |
| JP | 6355370 | 6/2018 |

OTHER PUBLICATIONS

Extended European Search Report dated Jun. 18, 2021 in European Patent Application No. 20196370.9, 12 pages.

*Primary Examiner* — Miya J Cato
*Assistant Examiner* — Pawan Dhingra
(74) *Attorney, Agent, or Firm* — XSENSUS LLP

(57) ABSTRACT

An information processing device to be a subject of appliance registration in a management server includes a first acquirer configured to acquire identification information for identifying the information processing device; an appliance registration requester configured to transmit an appliance registration request to the management server, the appliance registration request being for the appliance registration in the management server to associate the identification information acquired by the first acquirer with tenant information for identifying a tenant; and a second acquirer configured to acquire a setting value for use in processing an application to be installed in the information processing device; and a writer configured to write, to a storage, a setting value for the application acquired by the second acquirer.

18 Claims, 27 Drawing Sheets

(52) U.S. Cl.
CPC ..... *H04N 1/00408* (2013.01); *H04N 1/00938* (2013.01); *H04N 1/00973* (2013.01); *H04N 1/32101* (2013.01); *H04N 1/4426* (2013.01); *H04N 1/4433* (2013.01); *H04N 2201/0094* (2013.01)

(56) References Cited

U.S. PATENT DOCUMENTS

| | | |
|---|---|---|
| 2011/0022377 A1 | 1/2011 | Han et al. |
| 2011/0252347 A1* | 10/2011 | Osawa ............... H04N 1/00222 715/765 |
| 2012/0030585 A1* | 2/2012 | Akuzawa .............. G06F 3/0481 715/747 |
| 2013/0145141 A1 | 6/2013 | Han et al. |
| 2013/0219261 A1 | 8/2013 | Han et al. |
| 2013/0242331 A1 | 9/2013 | Ando |
| 2014/0082609 A1 | 3/2014 | Ono |
| 2015/0057990 A1 | 2/2015 | Han et al. |
| 2015/0309996 A1 | 10/2015 | Han |
| 2016/0337536 A1 | 11/2016 | Han |
| 2016/0337544 A1 | 11/2016 | Han |
| 2017/0078293 A1 | 3/2017 | Han |
| 2017/0255763 A1 | 9/2017 | Han |
| 2017/0255992 A1 | 9/2017 | Han |
| 2017/0272597 A1 | 9/2017 | Han |
| 2018/0039453 A1* | 2/2018 | Nakajima ............... G06F 21/10 |
| 2018/0302525 A1 | 10/2018 | Han |
| 2018/0341434 A1 | 11/2018 | Han |
| 2019/0199882 A1* | 6/2019 | Han ................... H04N 1/00244 |
| 2019/0281178 A1 | 9/2019 | Han |
| 2019/0373130 A1* | 12/2019 | Han .......................... G06F 8/62 |
| 2020/0137255 A1* | 4/2020 | Sasaki .................. H04N 1/0097 |
| 2020/0218636 A1* | 7/2020 | Anders ............... G06F 11/3608 |

* cited by examiner

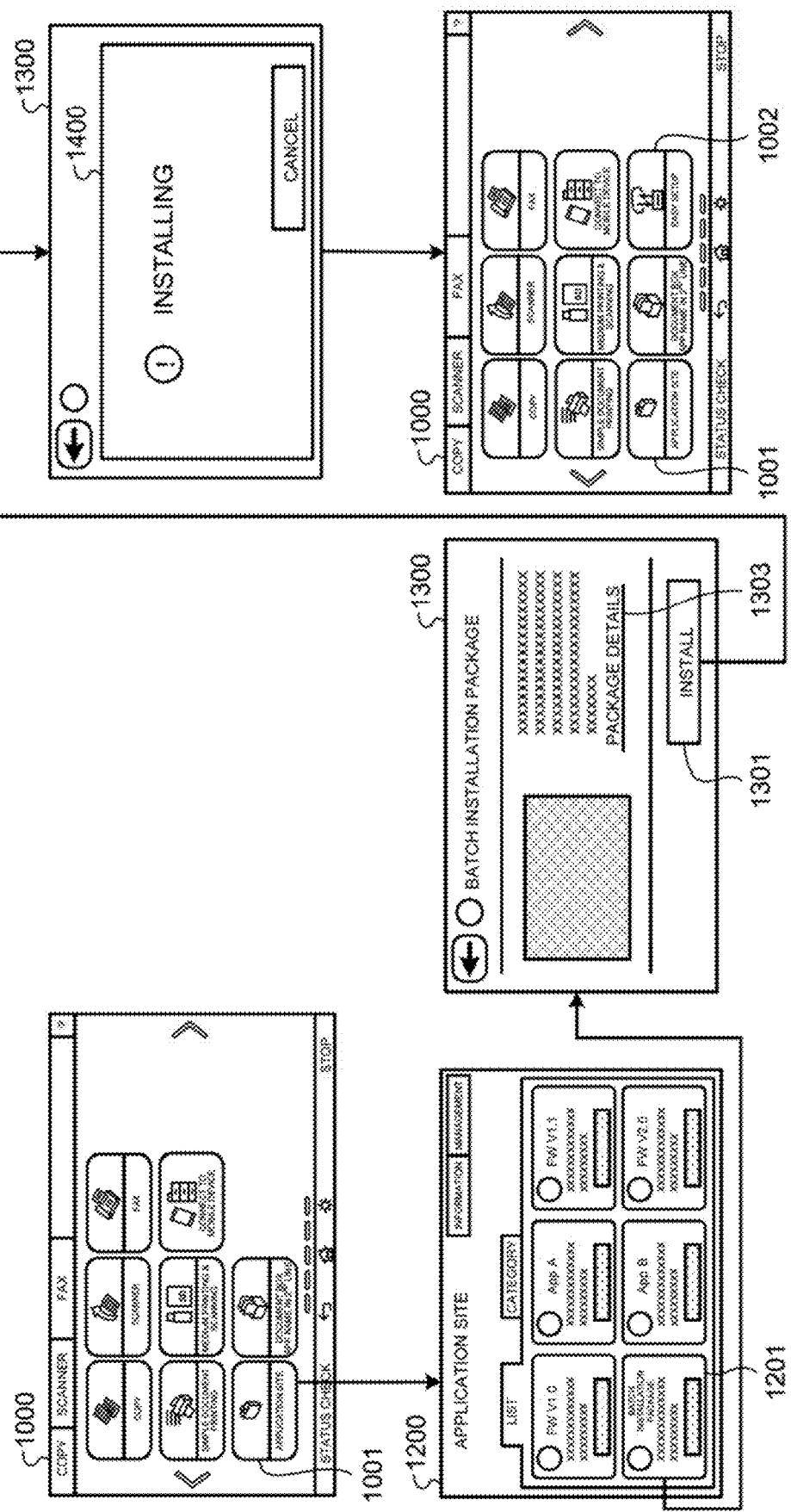

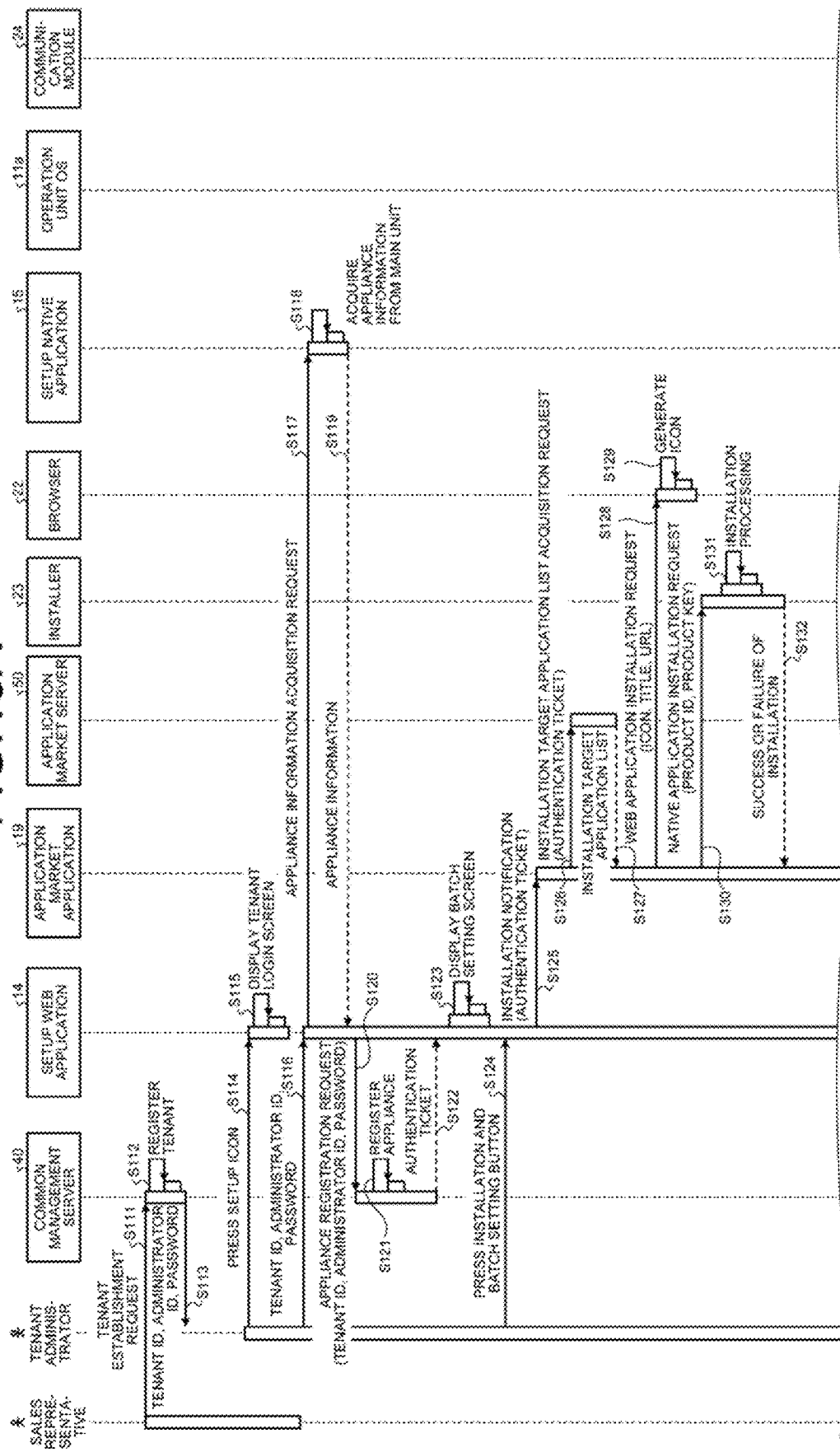

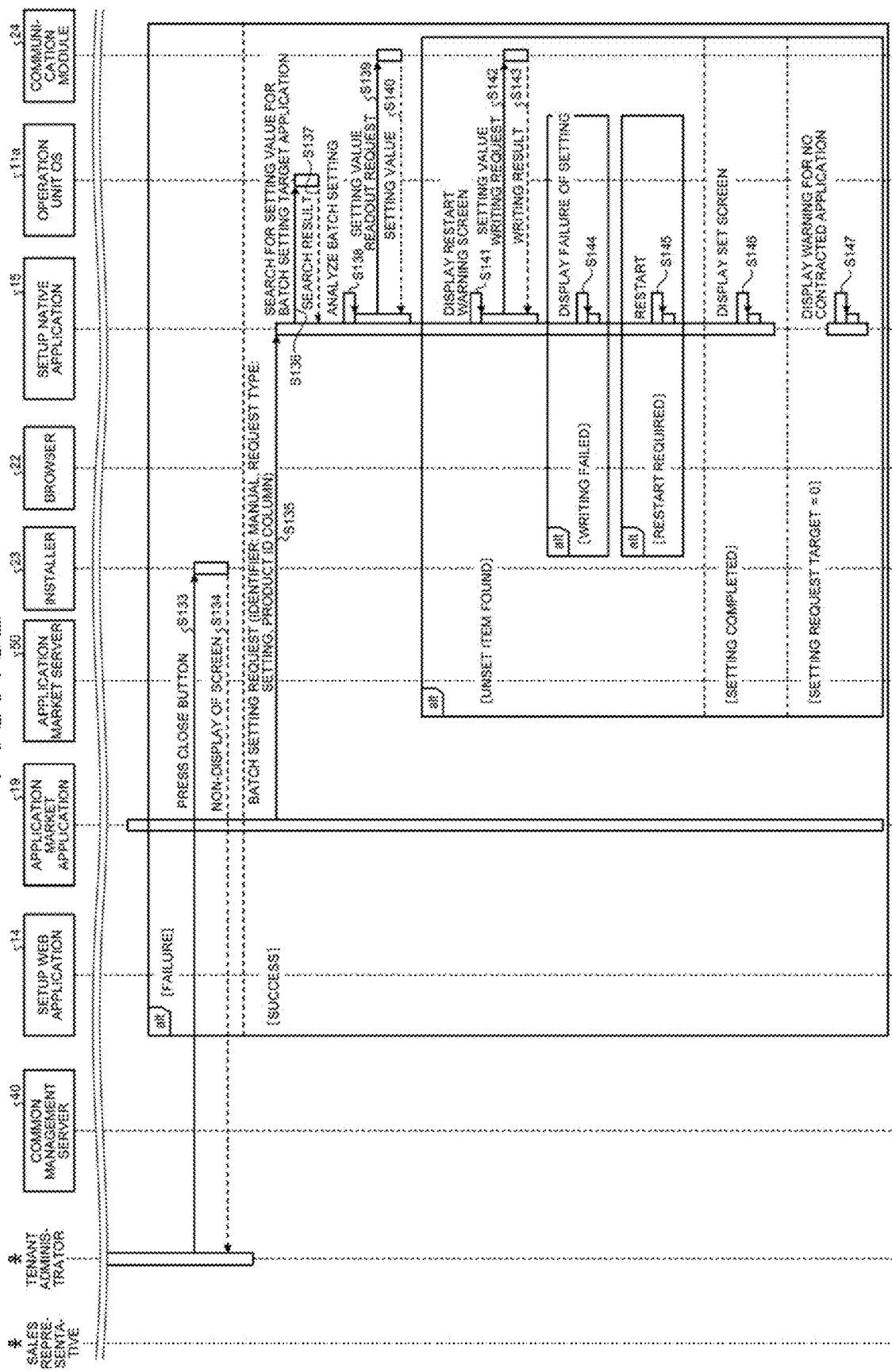

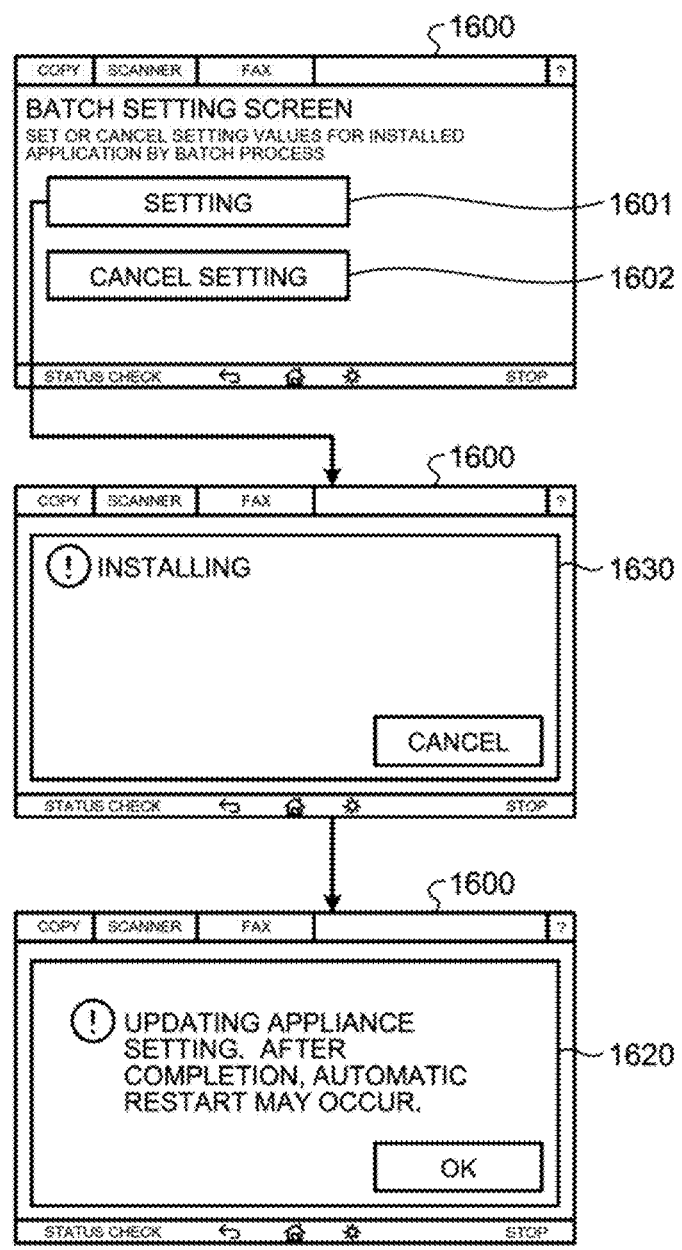

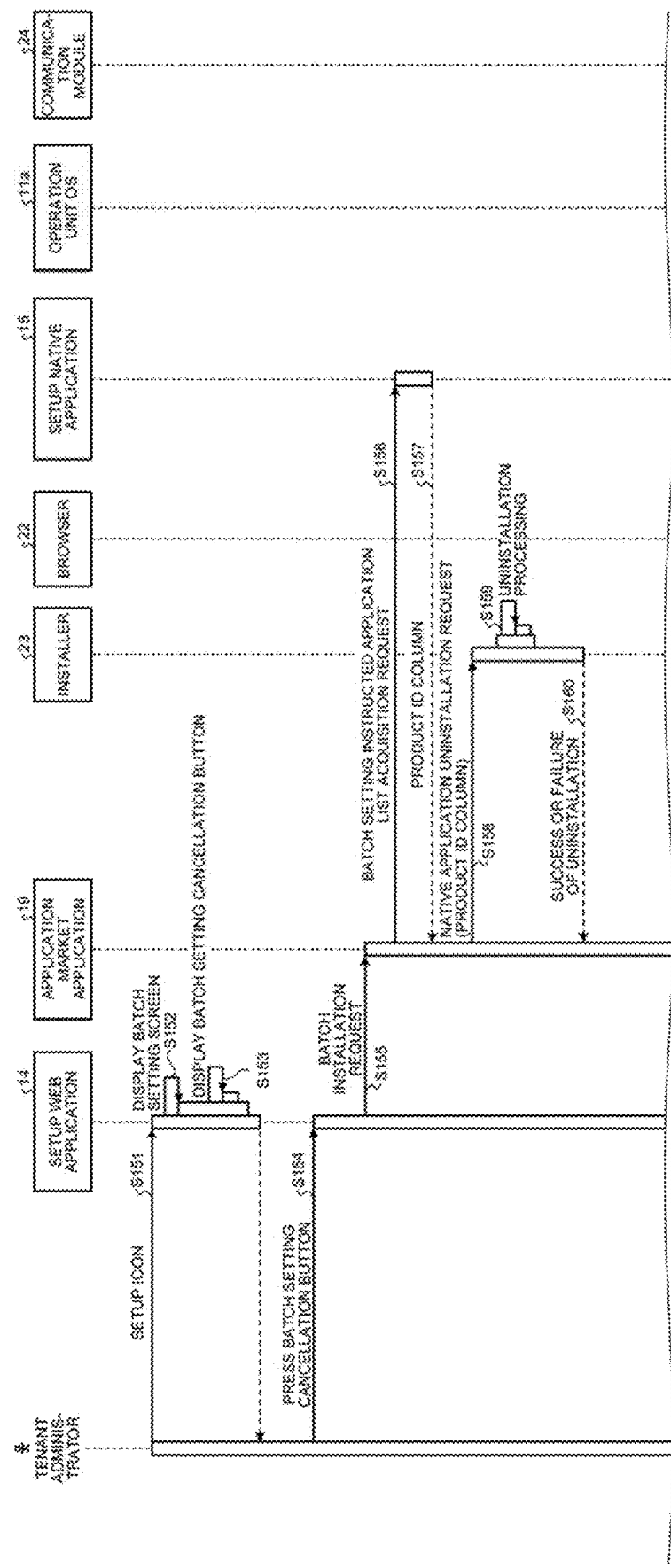

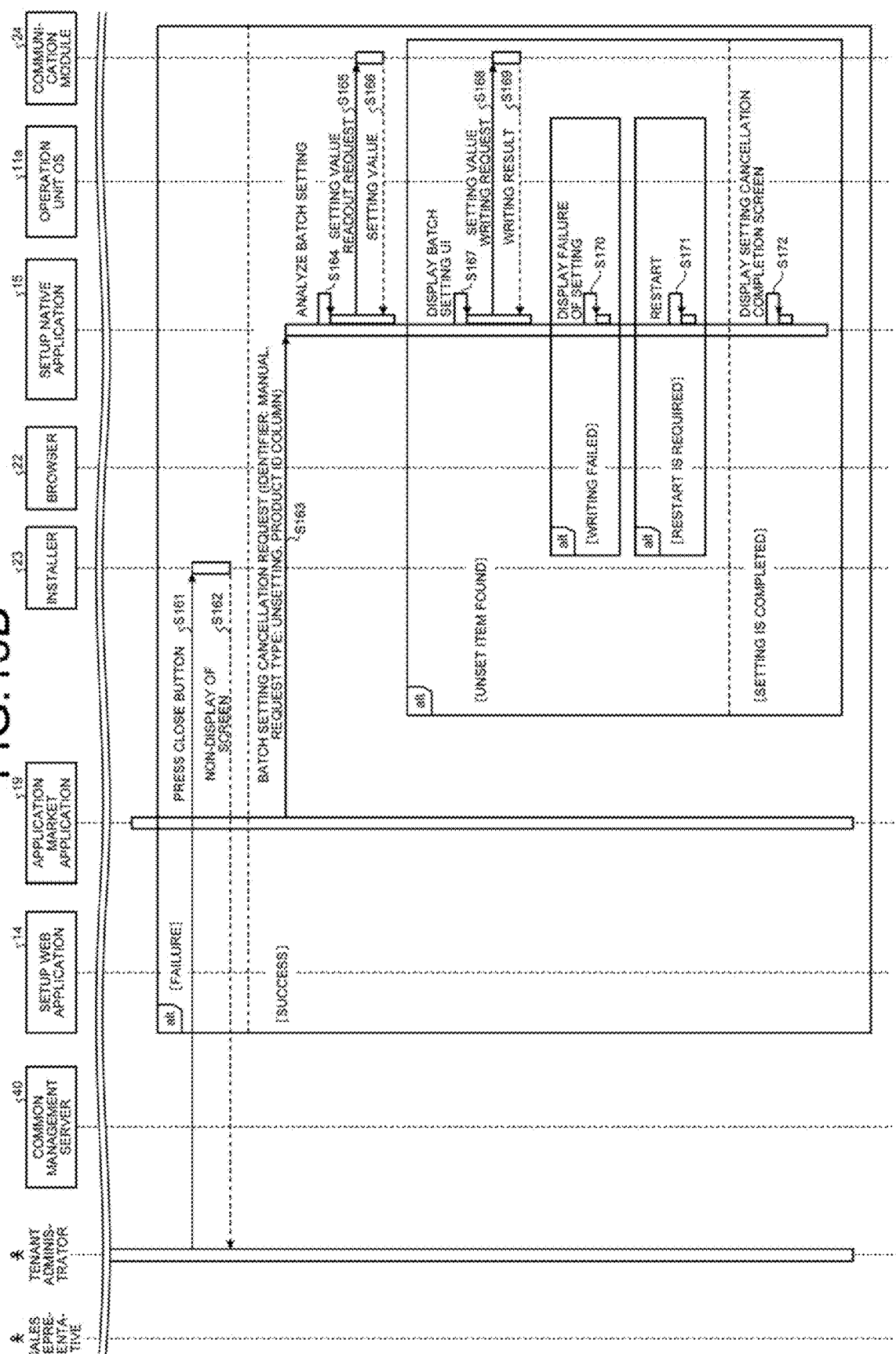

INFORMATION PROCESSING DEVICE TO BE SUBJECT OF APPLIANCE REGISTRATION IN A MANAGEMENT SERVER, INFORMATION PROCESSING SYSTEM, AND INFORMATION PROCESSING METHOD

CROSS-REFERENCE TO RELATED APPLICATIONS

The present application claims priority under 35 U.S.C. § 119 to Japanese Patent Application No. 2019-170938, filed on Sep. 19, 2019 and Japanese Patent Application No. 2019-207373, filed on Nov. 15, 2019. The contents of which are incorporated herein by reference in their entirety.

BACKGROUND OF THE INVENTION

1. Field of the Invention

The present invention relates to an information processing device, an information processing system, and an information processing method.

2. Description of the Related Art

An appliance management service serving as a cloud service is available for managing the state of a multifunction peripheral (MFP) as an exemplary information processing device. A system for providing such an appliance management service is disclosed, which includes an administrator that remotely manages an appliance by communicating therewith via a network, a mediator that mediates communication between the administrator and the appliance via the network to provide a service corresponding to a contract form of the appliance, and a receiver that receives requests from a plurality of appliances and distributes the requests to the corresponding mediators in accordance with the forms of contract of the appliances (described, for example, in Japanese Unexamined Patent Application Publication No. 2012-203430).

Conventionally, however, usage of the cloud service such as an appliance management service for the appliance requires work for associating the cloud service with the appliance. This may be troublesome for the user.

SUMMARY OF THE INVENTION

According to one aspect of the present invention, an information processing device to be a subject of appliance registration in a management server includes a first acquirer configured to acquire identification information for identifying the information processing device; an appliance registration requester configured to transmit an appliance registration request to the management server, the appliance registration request being for the appliance registration in the management server to associate the identification information acquired by the first acquirer with tenant information for identifying a tenant; a second acquirer configured to acquire a setting value for use in processing an application to be installed in the information processing device; and a writer configured to write, to a storage, a setting value for the application acquired by the second acquirer.

BRIEF DESCRIPTION OF THE DRAWINGS

FIG. 7 is a diagram illustrating a flow of screen transition at the time of installing an application in the installation and batch setting in a case in which the setup application is not installed in the appliance management system according to the first embodiment;

FIG. 13A is a sequence diagram illustrating an example of a procedure of manual installation and batch setting in a case in which the setup application is installed in the appliance management system according to the first embodiment;

FIG. 13B is a sequence diagram illustrating an example of a procedure of manual installation and batch setting in a case in which the setup application is installed in the appliance management system according to the first embodiment;

FIG. 14 is a diagram illustrating a flow of screen transition at the time of installation and batch setting of an application in the installation and batch setting in a case in which the setup application is installed in the appliance management system according to the first embodiment;

FIG. 15A is a sequence diagram illustrating an example of a procedure of uninstallation and batch setting cancellation processing in the appliance management system according to the first embodiment;

FIG. 15B is a sequence diagram illustrating an example of the procedure of uninstallation and batch setting cancellation processing in the appliance management system according to the first embodiment;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
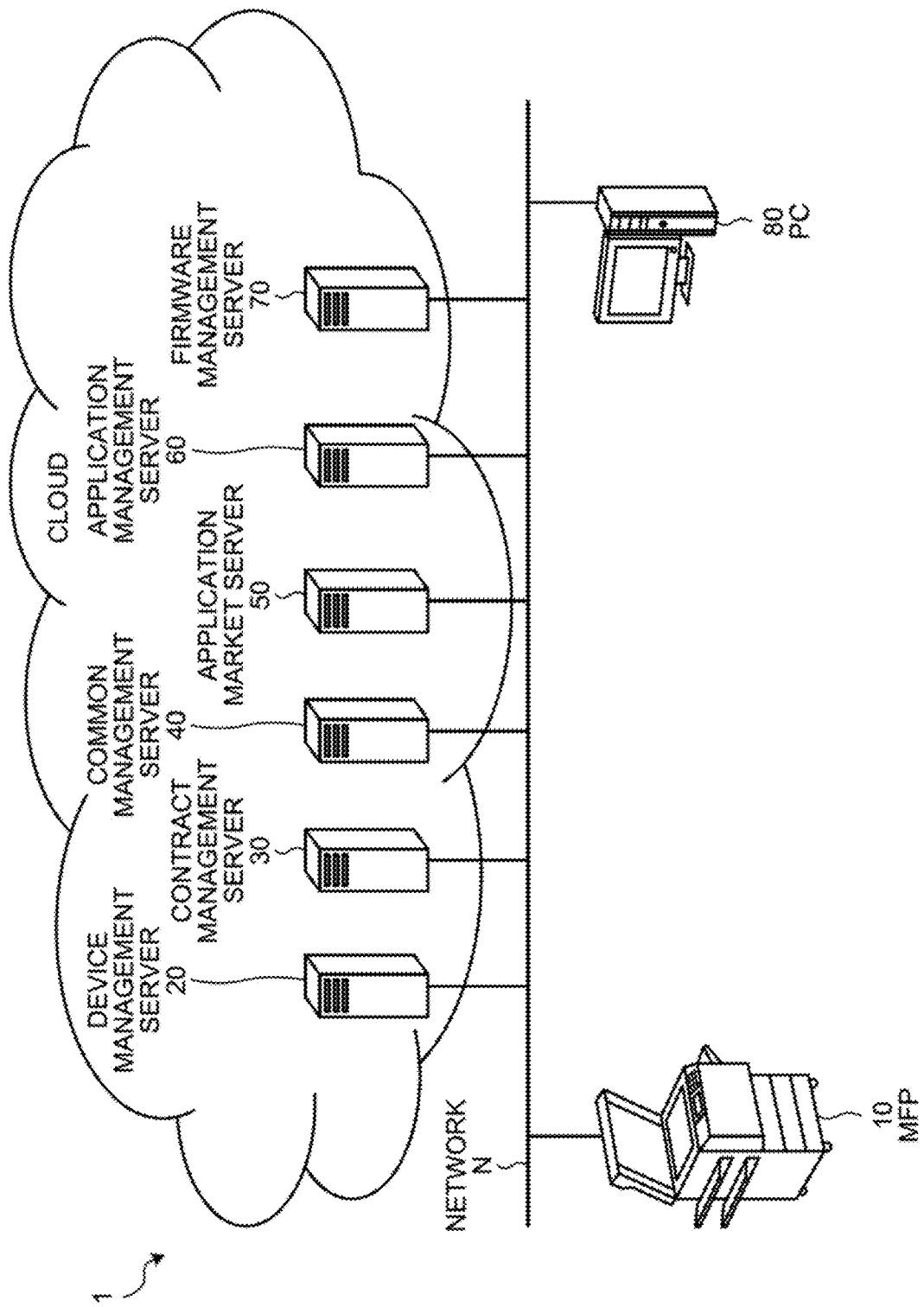
FIG. 1 is a diagram illustrating an example of the entire configuration of an appliance management system according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An object of the present invention is to provide an information processing device, an information processing system, and an information processing method that can easily associate the cloud service with the appliance, and reduce time and effort for preparation for receiving the cloud service.

Embodiments of the present invention will be described in detail below with reference to the drawings. The following describes an information processing device, an information processing system, and an information processing method according to one embodiment in detail with reference to the attached drawings. The present invention is not limited to the embodiments described below, and constituent elements in the following embodiments encompass a constituent element that is easily conceivable by those skilled in the art, substantially the same constituent element, and what is called an equivalent. Additionally, the constituent elements can be variously omitted, substituted, changed, and combined without departing from the gist of the following embodiments.

Computer software refers to computer programs involving in the operation of a computer, and other information equivalent to a computer program and for use in processing performed by a computer. Hereinafter, computer software is referred to as software. Application software is a general term for software used for executing specific tasks among classifications of software. An operating system (OS) signifies software that controls a computer to implement application software to use computer resources. The operating system performs basic management and control over a computer such as input/output control, hardware management such as a memory and a hard disk, and process management. The application software operates by use of a function provided by the operating system. The computer program refers to a combination of commands to a computer for the purpose of finding one result. The equivalent of the computer program is not a direct command to the computer and not referred to as a computer program, however, it has a property similar to the computer program in terms of defining computer's processing. For example, a data structure, i.e., a logical structure of data represented by a correlation between data elements, corresponds to the equivalent of the computer program.

In the following, the information processing device according to one embodiment is exemplified by a multifunction peripheral (MFP), but it is not limited thereto. The multifunction peripheral refers to a device having at least two of a printing function, a copying function, a scanner function, and a facsimile function. Examples of an image forming apparatus includes a single-function device such as a copying machine, a printer, a scanner, and a facsimile in addition to the multifunction peripheral. The information processing device may also be an office appliance or a shared terminal such as an electronic blackboard device and a remote video conference device, a user terminal such as a personal computer (PC) and a smartphone in which a given application is installed by a company, or a dedicated device such as a camera, an office-use appliance, an industrial appliance, and a medical device.

First Embodiment

Entire Configuration of Appliance Management System

FIG. 1 is a diagram illustrating an example of the entire configuration of an appliance management system according to a first embodiment. With reference to FIG. 1, the following describes the entire configuration of an appliance management system 1 according to the present embodiment.

As illustrated in FIG. 1, the appliance management system 1 includes an MFP 10 (an example of an information processing device), a device management server 20, a contract management server 30, a common management server 40 (the device management server 20, the contract management server 30, and the common management server 40 are examples of a management server), an application market server 50, an application management server 60, a firmware management server 70, and a personal computer (PC) 80 (an example of a setting-purpose appliance). These appliances can communicate with each other via a network N. Among these elements, the device management server 20, the contract management server 30, the common management server 40, the application market server 50, the application management server 60, and the firmware management server 70 provide a cloud service based on processing of itself. A plurality of information processing devices may be connected to the respective servers providing a cloud service in the appliance management system 1 via the network N. The network N mainly indicates the Internet, but the information processing device and some of the servers may be connected via a LAN.

The MFP 10 is an image forming device (an example of the information processing device) having a printing function for performing printing output based on print data. The MFP 10 is also an example of the information processing device as a target appliance in which an application (hereinafter, simply referred to as an application in some cases) is installed.

The device management server 20 is a server for storing and managing appliance output information (a job log, appliance information) output from the target appliance. The device management server 20 holds the following information: tenant information (described later); and appliance information, user information, and appliance output information (a job log, a setting value), associated with the tenant information. The device management server includes one or more Web applications, can associate the appliance output information transmitted from the application (described later) with the tenant information to be stored, and can display the stored appliance output information on a browser of the PC 80 to be able to be viewed by a user or a tenant administrator belonging to a tenant.

The contract management server 30 is a server for managing information such as a package name and a package ID of the application as a product, an application name, an ID (product ID), and content of the application, and a price (a monthly charge, an annual charge, or unit cost) of a user license and a device license for each package and each application.

The common management server 40 is a server for performing management of the tenant as a customer, license management for the application, account management, authentication processing. A storage 405 of the common management server 40 holds the following information.

(1) Tenant information (a tenant ID, a tenant name, a country or a region to which the tenant belongs, information representing a sales company that provides an application and an information processing device to the tenant)

(2) User information (a user ID, a tenant administrator ID, a default tenant administrator ID, a password corresponding to the ID, a user name, a role (a tenant administrator, a user), an e-mail address of the user, information about use authority for the application for each user)

(3) Appliance information (a serial number, classification (a multifunction peripheral, an electronic blackboard device), a model name, a device name, installation place information, and an IP address of the information processing device)

(4) License information (a package ID, an application ID, a product ID of the application, the number (total number) of device licenses for each application, the number (total number) of user licenses for the application, and the number of assigned licenses among the total number)

The tenant information is thus associated with the user information, the appliance information, and the license information. The common management server 40 includes one or more Web applications. The Web application provides an authentication management service using the tenant information and the user information, a user management service for performing an operation of additionally registering a user to the tenant after the tenant administrator log in by the authentication management service, an appliance management service for enabling the appliance information associated with the tenant ID to be viewed and managed, a license management service for enabling the license information to be viewed, and enabling manual setting of assignment of the license to the user or the appliance. The device management server 20, the contract management server 30, and the common management server 40 are examples of a management server. A group of the management servers provide one or more management services in the cloud service individually, or cooperating with each other.

The application market server 50 is a server that provides a cloud service of an application market site for providing, to the MFP 10, information related to a plurality of applications and pieces of firmware that can be installed in the information processing device such as the MFP 10. The applications that can be installed in the information processing device such as the MFP 10 include a native application and a Web application. The native application is an application that is used by being installed in the information processing device itself. The Web application is an application used on a browser while cooperating with an operation of a computer program executed on a Web server, which is a computer program operating on the browser of the information processing device (such as a script). Thus, the Web application is installed or introduced to the information processing device by registering a server connection destination (a URL as a connection destination of the browser) in the information processing device.

The application management server 60 is a server that holds an entity file of the application that can be installed in the information processing device such as the MFP 10 (hereinafter, may be referred to as an application object), and distributes the application object in response to a request from the MFP 10. Specifically, the application corresponding to the application object held by the application management server 60 is the native application.

The firmware management server 70 is a server that holds an entity file of firmware (including an operating system (OS)) that can be installed in the information processing device such as the MFP 10, and distributes the entity file of the firmware in response to a request from the MFP 10.

The PC 80 is an information processing device that installs applications and controls setting processing of setting values for a plurality of the information processing devices such as the MFP 10 remotely by batch.

In FIG. 1, the application management server 60 that manages the application and the firmware management server 70 that manages the firmware are different servers, but the embodiment is not limited thereto. The application and the firmware may be managed by the same server. In FIG. 1, the application market server 50 that provides information related to the application and the application management server 60 that manages the application are different servers, but the embodiment is not limited thereto. The information related to the application and the application may be managed by the same server, and additionally, the firmware managed by the firmware management server 70 may also be managed by the same server. An outline of the operation of each server illustrated in FIG. 1 has been described above, but the processing performed by each server may be performed by a different server. For example, the contract management server 30 may not only manage the information such as an application name, content, and price of the application as a product but also perform license management (contract management for the application) that is performed by the common management server 40.

Hardware Configuration of MFP

Figure 2:
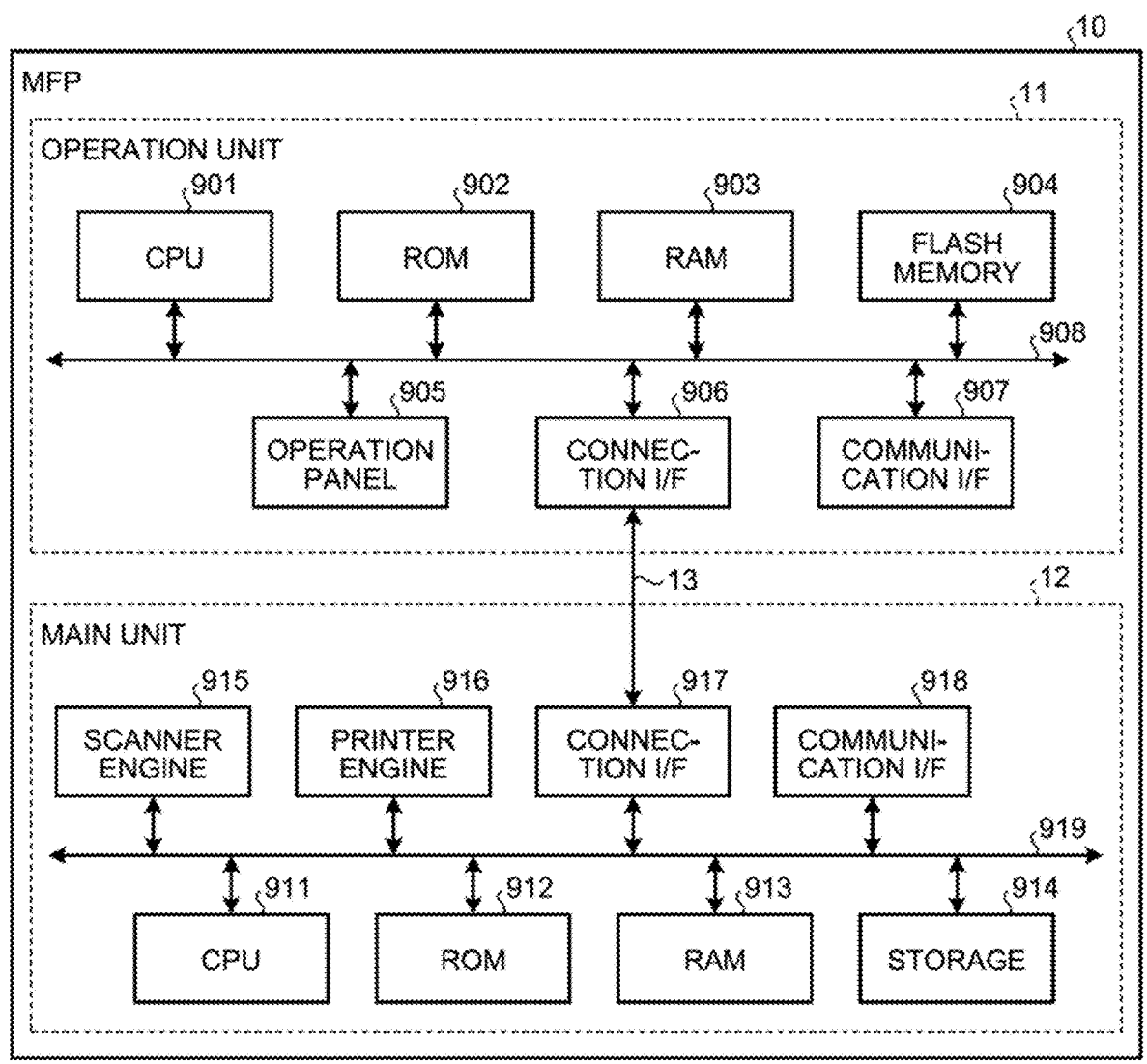
FIG. 2 is a diagram illustrating an example of a hardware configuration of an MFP according to the first embodiment.

FIG. 2 is a diagram illustrating an example of a hardware configuration of the MFP according to the first embodiment. With reference to FIG. 2, the following describes the hardware configuration of the MFP 10 according to the present embodiment.

As illustrated in FIG. 2, the MFP 10 includes an operation unit 11 that receives a user's operation, and a main unit 12 that implements various image forming functions such as a scanner function and a printer function. Herein, "receive a user's operation" includes receiving information (including a signal indicating a coordinate value on a screen) that is input through a user's operation.

The operation unit 11 and the main unit 12 are connected to each other in a communicable manner via a dedicated communication channel 13. As the communication channel 13, for example, a communication channel of a Universal Serial Bus (USB) standard can be used, but the embodiment is not limited thereto. A communication channel of an optional standard may be used irrespective of a wired type or a wireless type. The main unit 12 performs an operation corresponding to the operation received by the operation unit 11. The operation unit 11 and the main unit 12 can communicate with an external device, and can perform an operation corresponding to an instruction received from the external device.

Hardware Configuration of Operation Unit

As illustrated in FIG. 2, the operation unit 11 includes a central processing unit (CPU) 901, a read only memory (ROM) 902, a random access memory (RAM) 903, a flash memory 904, an operation panel 905 (an example of an input unit), a connection I/F 906, a communication I/F 907, and a bus 908.

The CPU 901 is an arithmetic device that integrally controls the operation of the operation unit 11. The CPU 901 controls the operation of the entire operation unit 11 by executing a computer program stored in the ROM 902, the flash memory 904, or the like using the RAM 903 as a work area (working area). For example, the CPU 901 implements various functions such as causing information (an image) corresponding to an input received from the user to be displayed on the operation panel 905.

The ROM 902 is, for example, a non-volatile memory that stores a Basic Input/Output System (BIOS) that is executed at the time of start of the operation unit 11, various settings. The RAM 903 is a volatile memory that is used as a work area for the CPU 901. The flash memory 904 is, for example, a non-volatile storage device that stores an OS, an application program, and various kinds of data.

The operation panel 905 is a device having an input function and a display function that receives various inputs corresponding to the operation performed by the user, and displays various kinds of information (for example, information corresponding to the received operation, information representing an operation condition of the MFP 10, setting information). The operation panel 905 is, for example, constituted of a liquid crystal display (LCD) on which a touch panel function is mounted. The operation panel 905 is not limited to the liquid crystal display, and may be constituted of an organic electro-luminescence (EL) display device on which a touch panel function is mounted, for example. In addition to or in place of the touch panel function, an operation unit such as a hardware key, or a display unit such as a lamp may be disposed on the operation panel 905.

The connection I/F 906 is an interface for communicating with the main unit 12 via the communication channel 13.

The communication I/F 907 is a network interface for connecting the operation unit 11 to the network N to communicate with an external device connected to the network N. The communication I/F 907 is, for example, an interface that is compatible with Ethernet (registered trademark), and can perform communication conforming to Transmission Control Protocol (TCP)/Internet Protocol (IP).

The bus 908 serves as a transmission line that connects the constituent elements described above to each other, and transmits an address signal, a data signal, and various kinds of control signals.

The hardware configuration of the operation unit 11 illustrated in FIG. 2 is merely an example, and may include a constituent element other than the constituent elements illustrated in FIG. 2.

Hardware Configuration of Main Unit

As illustrated in FIG. 2, the main unit 12 includes a CPU 911, a ROM 912, a RAM 913, a storage 914 (an example of a storage), a scanner engine 915, a printer engine 916, a connection I/F 917, a communication I/F 918, and a bus 919.

The CPU 911 is an arithmetic device that integrally controls an operation of the main unit 12. The CPU 911 controls the operation of the entire main unit 12 by executing a computer program stored in the ROM 912, the storage 914, or the like using the RAM 913 as a work area (working area). For example, the CPU 911 implements various functions such as a copying function, a scanner function, a facsimile function, and a printer function.

The ROM 912 is, for example, a non-volatile memory that stores a BIOS that is executed at the time of starting the main unit 12, and various settings. The RAM 913 is a volatile memory used as a work area of the CPU 911. The storage 914 is, for example, a non-volatile storage device that stores an OS, an application program, and various kinds of data. The storage 914 is, for example, constituted of a hard disk drive (HDD), a Solid State Drive (SSD), or the like.

The scanner engine 915 is hardware that performs versatile information processing and processing other than communication for implementing a scanner function of scanning a document to be read as an image of the image forming function. The printer engine 916 is hardware that performs versatile information processing and processing other than communication for implementing a printer function of performing printing on a printing medium such as a sheet of the image forming function.

The connection I/F 917 is an interface for communicating with the operation unit 11 via the communication channel 13.

The communication I/F 918 is a network interface for connecting the main unit 12 to the network N to communicate with an external device connected to the network N. The communication I/F 918 is, for example, an interface that is compatible with Ethernet, and can perform communication conforming to TCP/IP.

The bus 919 is a transmission line that connects the constituent elements described above to each other, and transmits an address signal, a data signal, and various kinds of control signals.

The hardware configuration of the main unit 12 illustrated in FIG. 2 is merely an example, and may include a constituent element other than the constituent elements illustrated in FIG. 2. For example, the hardware configuration may include a specific option such as a finisher that sorts printing media on which printing has been performed, or an auto document feeder (ADF) that automatically feeds a document.

Hardware Configuration of Common Management Server

Figure 3:
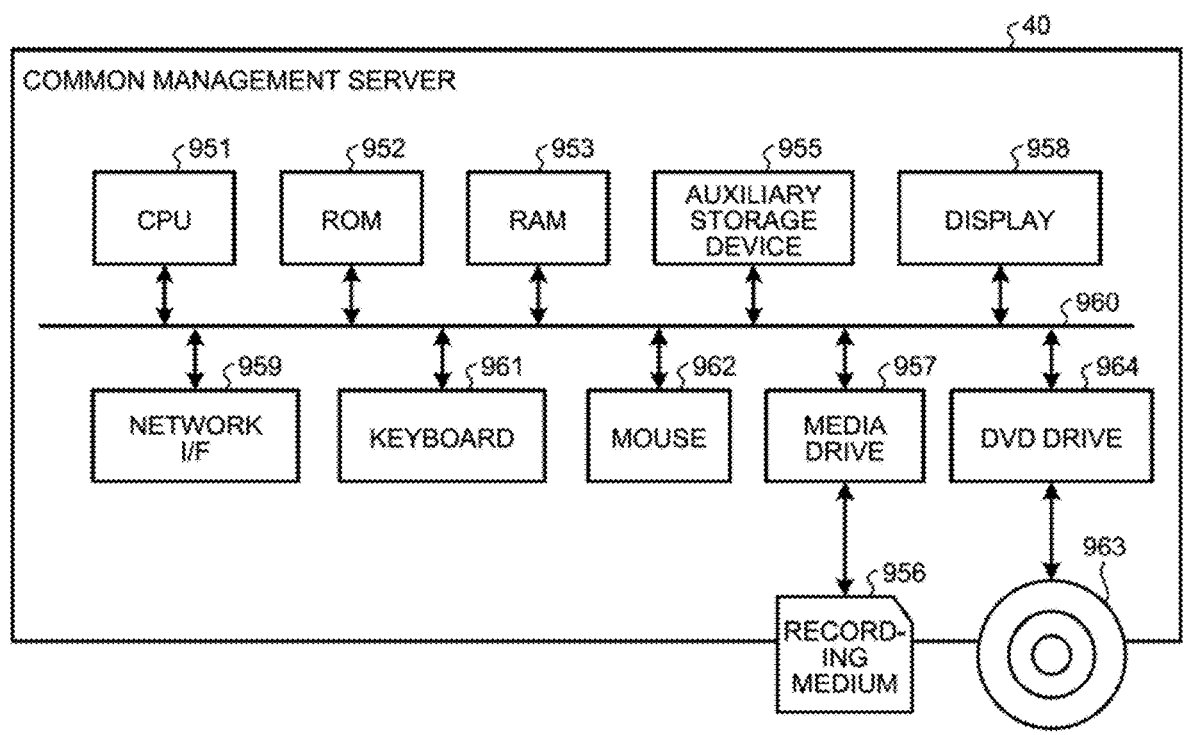
FIG. 3 is a diagram illustrating an example of a hardware configuration of a common management server according to the first embodiment.

FIG. 3 is a diagram illustrating an example of a hardware configuration of the common management server according to the first embodiment. With reference to FIG. 3, the following describes the hardware configuration of the common management server 40 according to the present embodiment.

As illustrated in FIG. 3, the common management server 40 includes a CPU 951, a ROM 952, a RAM 953, an auxiliary storage device 955, a media drive 957, a display 958, a network I/F 959, a keyboard 961, a mouse 962, and a digital versatile disc (DVD) drive 964.

The CPU 951 is an arithmetic device that controls the operation of the entire common management server 40. The ROM 952 is a non-volatile storage device that stores a computer program for the common management server 40. The RAM 953 is a volatile storage device used as a work area of the CPU 951.

The auxiliary storage device 955 is a storage device such as an HDD or an SSD that stores management information of a tenant, management information of a license, and management information of an account. The media drive 957 is a device that controls readout and writing of data for a recording medium 956 such as a flash memory under control by the CPU 951.

The display 958 is a display device constituted of a liquid crystal, organic EL, or the like that displays various kinds of information such as a cursor, a menu, a window, a character, an image, or the like.

The network I/F 959 is an interface for communicating data with an external device such as the contract management server 30 by using the network N. The network I/F 959 is, for example, a network interface card (NIC) that is compatible with Ethernet, and can perform communication conforming to TCP/IP.

The keyboard 961 is an input device for selecting a character, a numeral, and various instructions, and moving a cursor, for example. The mouse 962 is an input device for selecting and executing various instructions, selecting a processing target, and moving a cursor, for example.

The DVD drive 964 is a device that controls readout and writing of data for a DVD 963 such as a DVD-ROM or a Digital Versatile Disk Recordable (DVD-R) as an example of a removable storage medium.

The CPU 951, the ROM 952, the RAM 953, the auxiliary storage device 955, the media drive 957, the display 958, the network I/F 959, the keyboard 961, the mouse 962, and the DVD drive 964 described above are connected to each other in a communicable manner via a bus line 960 such as an address bus and a data bus.

The hardware configuration of the common management server 40 illustrated in FIG. 3 is merely an example, and does not necessarily include all of the constituent elements illustrated in FIG. 3, or may include another constituent element.

The hardware configuration illustrated in FIG. 3 has been described as the hardware configuration of the common management server 40, but hardware configurations of the device management server 20, the contract management server 30, the application market server 50, the application management server 60, the firmware management server 70, and the PC 80 are equivalent to the hardware configuration illustrated in FIG. 3.

Software Configuration of Appliance Management System

Figure 4:
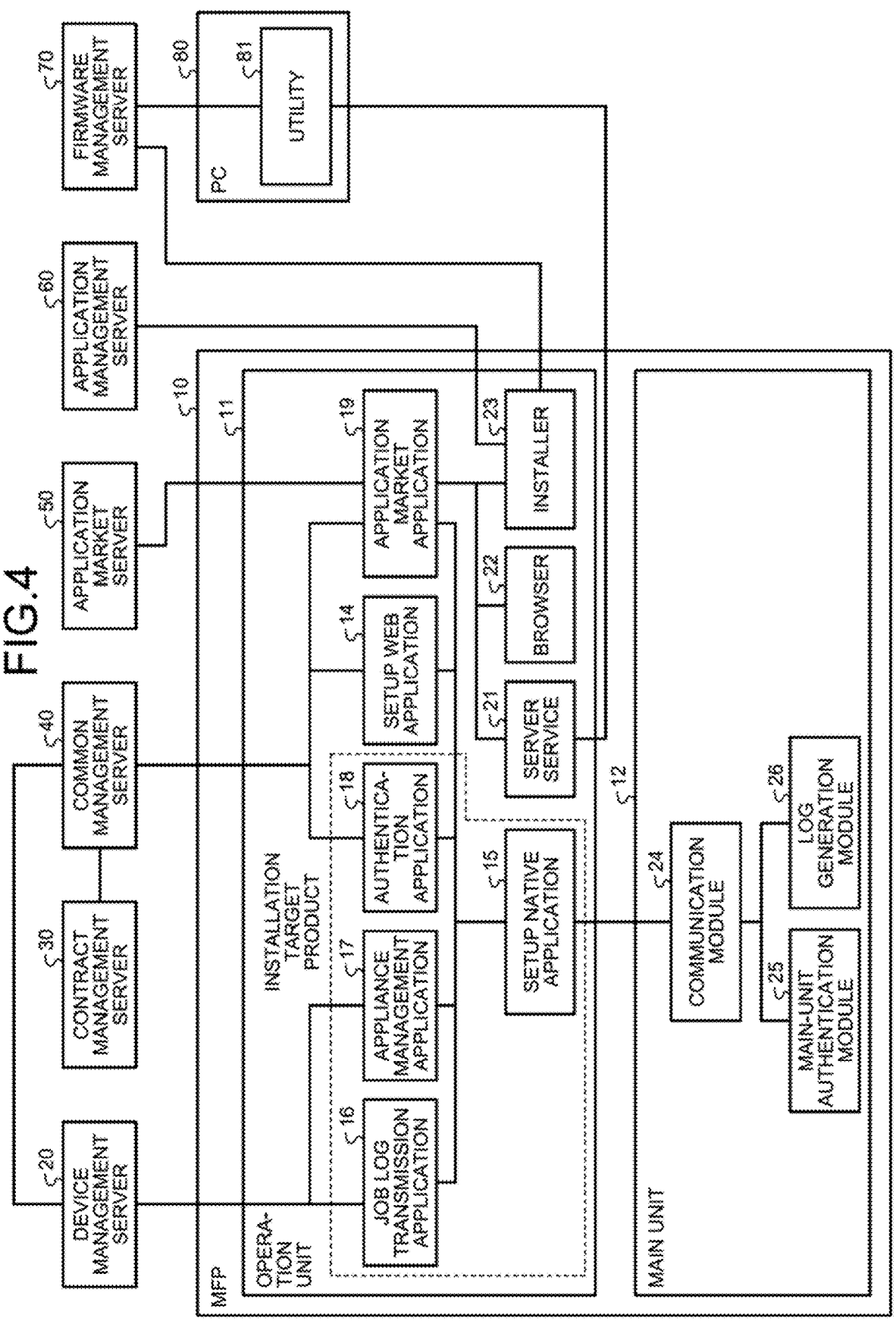
FIG. 4 is a diagram illustrating an example of a software configuration of the appliance management system according to the first embodiment.

FIG. 4 is a diagram illustrating an example of a software configuration of the appliance management system according to the first embodiment. With reference to FIG. 4, the following describes the software configuration of the appliance management system 1 according to the present embodiment.

As illustrated in FIG. 4, the operation unit 11 of the MFP 10 includes a setup Web application 14, a setup native application 15, a job log transmission application 16, an appliance management application 17, an authentication application 18, an application market application 19, a server service 21, a browser 22, and an installer 23.

The setup Web application 14 serves to perform, cooperating with the setup native application 15, registration of appliance for associating the information processing device such as the MFP 10 with the tenant information of the common management server 40 to receive a cloud service, installation control of an application required at the time of introduction by the appliance registration, setting processing of a setting value (setting value of the application) to be set to the information processing device such as the MFP 10 for executing principal processing of the application. The following Table 1 lists examples of setting values for applications for use in introduction by the appliance registration in the common management server 40. "At the time of introduction by the appliance registration of the information processing device" indicates the time at which the cloud service is introduced into the information processing device to be started, for example. Introduction and start of use of the cloud service in the information processing device indicate a series of necessary processing at the time of introduction from no connection of the cloud to actual start of the information processing device to use at least part of the cloud service, the series of processing including appliance registration of the information processing device for a tenant to which the appliance belongs in the cloud service, confirmation of a service contracted by the tenant to which the appliance belongs (a package application, an individual application, and license information), and start of use of part of the cloud service. Part of the cloud service refers to a service provided by an application at the time of introduction (described later) in cooperation with each server, for example, an appliance management service provided by the device management server 20 or an authentication management service provided by the common management server 40. Other examples of the cloud service include services provided by the function of the information processing device in cooperation with the function of the cloud such as cloud print (pull print by a remote MFP) and a scan to cloud storage (scanned image transmission). These services are usable on the appliance after the introduction by the appliance registration of the information processing device to the tenant information. Additionally, the cloud service also includes execution of a purchase contract of an application that is provided by the cloud service and used on the information processing device or the PC 80, and using the application after purchase contract on the information processing device or the PC 80.

TABLE 1

| Application | Necessity to restart at time of setting change | Item name | Value set at installation | Value set in canceling installation |
|---|---|---|---|---|
| Authentication application | Unnecessary | User administrator authentication | Yes | No |
| | Unnecessary | User authentication management | Custom authentication | No |
| | Unnecessary | User automatic deletion | Yes | No |
| Job log transmission application | Unnecessary | Log operation mode | 4 | 4 |
| | Unnecessary | Log transfer/transfer setting timing | 1 | 0 |
| | Necessary | Setting -> appliance -> log -> job log collection | Valid | Invalid |

The setup native application 15 is a native application that performs, in cooperation with the setup Web application 14, appliance registration of the information processing device such as the MFP 10 in the common management server 40, installation control of the application required at the time of introduction by the appliance registration, and sets the setting value of the application, to receive the cloud service. Hereinafter, the setup Web application 14 and the setup native application 15 that perform appliance registration in the common management server 40, installation control of the application required at the time of introduction by the appliance registration, and setting processing of the setting value of the application may be collectively referred to as a "setup application". In the present embodiment, the setup application includes the native application and the Web application. Introduction may be executed by the setup application including either the native application or the Web application alone.

The job log transmission application 16 is an example of the application to be installed at the time of introduction by the appliance registration of the information processing device such as the MFP 10 for the common management server 40, and is an application that collects job logs generated in the information processing device such as the MFP 10 to be transmitted to the device management server 20. Examples of the setting values for the job log transmission application 16 are indicated by Table 1. As indicated by Table 1, items of the setting values for the job log transmission application 16 include "log operation mode", "log transfer/transfer setting timing", and "job log collection", and setting is established corresponding to the setting items and values in Table 1 such that all job logs executed by the information processing device (log operation mode: 4) are automatically generated in accordance with job execution (job log collection: ON), and the job logs are transmitted to a given external server each time the job log is generated (transmission timing: 1). Accordingly, the setting for log collection and transmission performed by the job log transmission application 16 can be established in the information processing device. As the external server, the device management server 20 is set in the job log transmission application 16. The Web application providing the appliance management service in the device management server 20 acquires the job log, and associates the job log with the tenant information and appliance information belonging thereto to be stored.

The appliance management application 17 is an example of an application to be installed at the time of introduction by the appliance registration of the information processing device such as the MFP 10 for the common management server 40, and is an application that transmits, to the device management server 20, the appliance information, the setting values of the MFP 10 (authentication ON, job log collection ON, and an IP address and a host name set to the appliance), and an appliance status (state of consumables, an error state, and an energy-saving transition state). Table 1 above does not contain setting values used in execution of processing by the appliance management application 17. However, setting data of the appliance management application 17 can be settings that enable transmission of setting values and application status to the external server, for example.

The authentication application 18 is an example of an application to be installed at the time of introduction by the appliance registration of the information processing device such as the MFP 10 for the common management server 40, and is an application for authenticating a login of the information processing device such as the MFP 10 using an authentication result obtained outside the device by an account (account of the cloud) managed by the common management server 40 by transmitting user information input via the MFP 10 to the common management server 40. Examples of the setting values for the authentication application 18 are indicated by Table 1. As indicated by Table 1, items of the setting values for the authentication application 18 include "user administrator authentication", "user authentication management", and "user automatic deletion", and setting is established corresponding to the setting items and values in Table 1 described above such that a login of the information processing device is authenticated (user authentication management: custom authentication, and user administrator authentication: Yes) by using an authentication application added (customized) to the information processing device, transmitting the acquired user information to an authentication destination (common management server 40) set by the authentication application to perform authentication processing at the authentication destination, and obtaining an authentication result. Additionally, the setting value of "user administrator authentication: Yes" may be a setting such that, in a case in which the user is the tenant administrator as a result of authentication performed by the common management server 40, a login of the information processing device as the administrator of the appliance is authenticated (user administrator authentication: Yes), and in a case in which administrator authentication has succeeded, an administrator function in the information processing device (permission for address book editing or manual change of the setting value) is allowed to be used. The information processing device includes a function by which the user information authenticated by the common management server 40 as the authentication destination is automatically and successively stored in a storage region (an address book) in the information processing device. An additional setting can be established such that, at the time when a storage amount of the user information in the address book reaches a given amount, information that is assumed to be unused such as the oldest user information (or user information on which authentication processing has not been performed for a given period) is deleted, and the user information authenticated by the common management server 40 is newly added to the information processing device (user automatic deletion: Yes). The setting of "user automatic deletion: Yes" may be a setting such that, after the authentication processing of the user information performed by the common management server 40 as the authentication destination, the acquired user information is automatically deleted from the information processing device (a cache of a browser function for transmitting the user information by the authentication application) irrespective of an authentication result. With the setting values described above, the setting of the authentication application 18 for performing the authentication processing cooperating with the common management server 40 can be established in the information processing device. The item names and values in the setting of Table 1 described above are held by each introduction application as setting data, which is information written in a setting file of object data of the application being the native application. At the time of batch setting cancellation, the value to be set at the time of setting cancellation in Table 1 is referred to, and set for the information processing device. Each introduction application refers to the setting value set for the information processing device after being started or at the time of performing processing, and performs processing of each introduction application based on the setting value.

The application market application 19 is an application that communicates with an application market site provided by the application market server 50, and acquires a list of applications and firmware that can be installed in the information processing device such as the MFP 10 in accordance with an operation performed by the user.

The server service 21 is a service that provides a function of a Web server that operates on the operation unit 11, and relays exchange of information with the application market application 19.

The browser 22 is software that implements a function as a Web application by acquiring various pieces of content provided by the Web server (for example, HyperText Markup Language (HTML), Cascading Style Sheets (CSS), JavaScript (registered trademark), and various electronic files). In the present embodiment, the browser 22 generates a shortcut icon of the Web application in accordance with a command from the application market application 19.

The installer 23 is a module that downloads an entity file (object file) of the native application or firmware from the application management server 60 or the firmware management server 70 in accordance with a command from the application market application 19, and installs the entity file in the operation unit 11.

As illustrated in FIG. 4, the main unit 12 of the MFP 10 includes a communication module 24, a main authentication module 25, and a log generation module 26.

The communication module 24 is a module that relays data communication between an application and module of the operation unit 11 and a module of the main unit 12.

The main authentication module 25 is a module that performs authentication control for the main unit 12 by communication via the authentication application 18 and the communication module 24.

The log generation module 26 is a module that generates an operation log of a function operating on the main unit 12, and transmitting the operation log to the job log transmission application 16 via the communication module 24.

As illustrated in FIG. 4, the PC 80 includes a utility 81. The utility 81 is software that remotely performs control for installation of applications and setting processing of the setting values by batch for the information processing device such as the MFP 10.

The configuration of each piece of software illustrated in FIG. 4 is merely an example, and the configuration is not limited thereto. For example, a plurality of pieces of software as independent pieces of software in the operation unit 11 illustrated in FIG. 4 may be configured as one piece of software. On the other hand, a function of one piece of software in the operation unit 11 illustrated in FIG. 4 may be divided into a plurality of functions, and may be configured as a plurality of pieces of software.

Configuration and Operation of Functional Block of Appliance Management System

Figure 5:
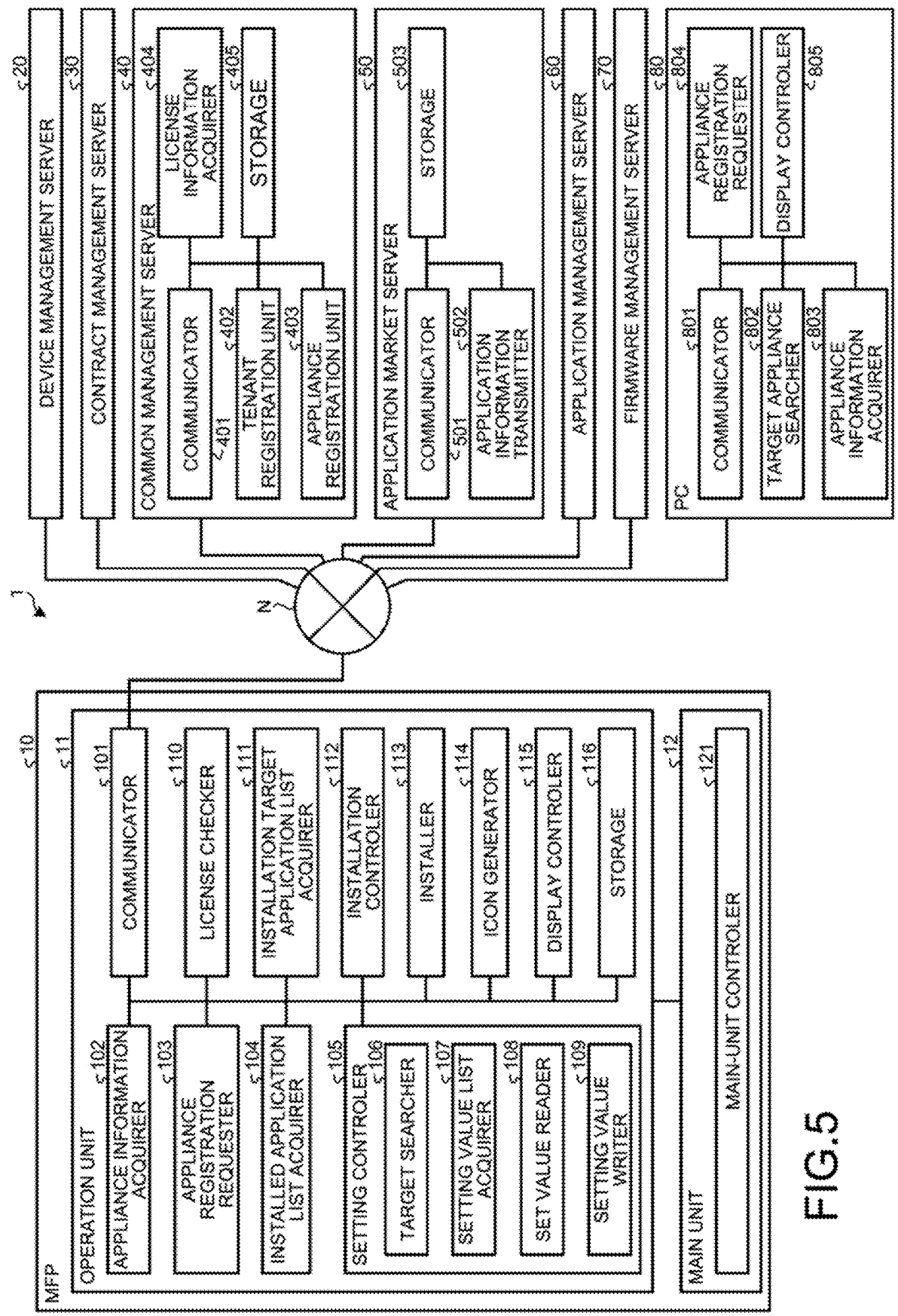
FIG. 5 is a diagram illustrating an example of a configuration of a functional block of the appliance management system according to the first embodiment.

FIG. 5 is a diagram illustrating an example of a configuration of a functional block of the appliance management system according to the first embodiment. With reference to FIG. 5, the following describes a configuration and an operation of the functional block of the appliance management system 1 according to the present embodiment.

As illustrated in FIG. 5, the operation unit 11 of the MFP 10 includes a communicator 101, an appliance information acquirer 102 (a first acquirer), an appliance registration requester 103, an installed application list acquirer 104, a setting controller 105, a license checker 110 (a determiner, a third acquirer), an installation target application list acquirer 111 (a fourth acquirer), an installation controller 112, an installer 113, an icon generator 114 (generator), a display controller 115 (a first display controller, a second display controller), and a storage 116.

The communicator 101 is a functional unit that performs data communication with the device management server 20, the common management server 40, the application market server 50, the application management server 60, and the firmware management server 70 via the network N. The communicator 101 is implemented when the communication I/F 907 and the CPU 901 illustrated in FIG. 2 execute a computer program (the server service 21).

The appliance information acquirer 102 is a functional unit that acquires appliance information (including a serial number (an example of identification information) of the MFP 10) of the main unit 12 from a main controller 121. The appliance information acquirer 102 is implemented when the CPU 901 illustrated in FIG. 2 executes a computer program (the setup Web application 14, the setup native application 15).

The appliance registration requester 103 is a functional unit that transmits, to the common management server 40, an appliance registration request including a tenant ID (an example of tenant information), an administrator ID, and a password input via the operation panel 905 together with the appliance information acquired by the appliance information acquirer 102 via the communicator 101. The appliance registration requester 103 is implemented when the CPU 901 illustrated in FIG. 2 executes a computer program (the setup Web application 14).

The installed application list acquirer 104 is a functional unit that acquires a list of applications that have been already installed in the operation unit 11 (a list of identification information of the applications) from the installer 23 via the browser 22. The installed application list acquirer 104 is implemented when the CPU 901 illustrated in FIG. 2 executes a computer program (the setup Web application 14, the setup native application 15, the browser 22, the installer 23).

The setting controller 105 is a functional unit that controls setting processing of the setting value related to the application that has been installed at the time of introduction by appliance registration of the information processing device such as the MFP 10 for the common management server 40. As illustrated in FIG. 5, the setting controller 105 includes a target searcher 106, a setting value list acquirer 107 (a second acquirer), a set value reader 108, and a setting value writer 109 (writer). The setting controller 105 is implemented by a computer program (the setup native application 15, for example) executed by the CPU 901 illustrated in FIG. 2.

The target searcher 106 is a functional unit that searches for an application as a setting target of the setting value, that is, a licensed application among applications that are installed at the time of introduction by appliance registration of the information processing device such as the MFP 10 for the common management server 40 (hereinafter, may be referred to as "an introduction application"). Specifically, the target searcher 106 searches for an application as a setting target of the setting value that has been licensed. The setting value list acquirer 107 is a functional unit that acquires setting data defining a list of setting values in extensible markup language (XML) format, for example, included in the introduction application (for example, the job log transmission application 16, the appliance management application 17, and the authentication application 18). In a case in which the introduction application is the Web application, the setting data or the setting value may be acquired by making a request to the Web application. The set value reader 108 is a functional unit that reads the value set to the introduction application from the main unit 12. The setting value writer 109 is a functional unit that writes, to the main unit 12, the setting data for use in processing the introduction application acquired by the setting value list acquirer 107 as the setting value.

The license checker 110 is a functional unit that checks whether a license contract is made for the introduction application with respect to the common management server 40. The license checker 110 is implemented when the CPU 901 illustrated in FIG. 2 executes a computer program (the setup native application 15). The license checker 110 may also be implemented when the CPU 901 executes the setup Web application 14.

The installation target application list acquirer 111 is a functional unit that acquires, from the application market server 50, a list of applications (a list of identification information of the applications) to be installed at the time of introduction by appliance registration of the information processing device such as the MFP 10 for the common management server 40. The installation target application list acquirer 111 is implemented when the CPU 901 illustrated in FIG. 2 executes a computer program (the application market application 19).

The installation controller 112 is a functional unit that transmits an installation request for the introduction application to the installer 113 and the icon generator 114. The installation controller 112 is implemented when the CPU 901 illustrated in FIG. 2 executes a computer program (the setup Web application 14, the application market application 19).

The installer 113 is a functional unit that receives, when receiving the installation request for the native application among the introduction applications from the installation controller 112, an entity file (object file) of the native application from the application management server 60, and installs the native application using the entity file. The installer 113 is implemented when the CPU 901 illustrated in FIG. 2 executes a computer program (the installer 23).

The icon generator 114 is a functional unit that generates, when receiving an installation request for the Web application among the introduction applications from the installation controller 112, a shortcut icon for designating a path including an execution file of the Web application. The icon generator 114 is implemented when the CPU 901 illustrated in FIG. 2 executes a computer program (the browser 22).

The display controller 115 is a functional unit that performs display control for various screens such as an application list screen, an application installation screen, a tenant login screen, and a batch setting screen. The display controller 115 is implemented when the CPU 901 illustrated in FIG. 2 executes a computer program (the browser 22, the setup Web application 14, the setup native application 15).

The storage 116 is a functional unit that stores various kinds of data such as setting values for various applications. The storage 116 is implemented by at least one of the RAM 903 and the flash memory 904 illustrated in FIG. 2.

As illustrated in FIG. 5, the main unit 12 of the MFP 10 includes a main controller 121.

The main controller 121 is a functional unit that acquires the appliance information including the serial number of the MFP 10 from the main unit 12. The main controller 121 is implemented when the CPU 911 illustrated in FIG. 2 executes a computer program.

Some or all of the appliance information acquirer 102, the appliance registration requester 103, the installed application list acquirer 104, the setting controller 105, the license checker 110, the installation target application list acquirer 111, the installation controller 112, the installer 113, the icon generator 114, the display controller 115, and the main controller 121 of the MFP 10 illustrated in FIG. 5 may be implemented by a hardware circuit such as a field-programmable gate array (FPGA) or an application specific integrated circuit (ASIC) instead of a computer program as software.

As illustrated in FIG. 5, the common management server 40 includes a communicator 401, a tenant registration unit 402, an appliance registration unit 403, a license information acquirer 404, and the storage 405.

The communicator 401 is a functional unit that performs data communication with the MFP 10, the device management server 20, and the contract management server 30 via the network N. The communicator 401 is implemented when the network I/F 959 and the CPU 951 illustrated in FIG. 3 execute a computer program.

The tenant registration unit 402 is a functional unit that registers the tenant ID for identifying the tenant to which the MFP 10 belongs. The tenant registration unit 402 causes the tenant ID to be stored in the storage 405 to be registered. The tenant registration unit 402 is implemented when the CPU 951 illustrated in FIG. 3 executes a computer program.

The appliance registration unit 403 is a functional unit that searches for, in accordance with the appliance registration request from the MFP 10, a tenant ID matching the tenant ID for identifying the tenant included in the appliance registration request from tenant IDs registered by the tenant registration unit 402, and associates the searched tenant ID with the information (serial number) for identifying the MFP 10 as the appliance information to perform appliance registration. The appliance registration unit 403 causes the storage 405 to store the information associating the tenant ID with the serial number. The appliance registration unit 403 is implemented when the CPU 951 illustrated in FIG. 3 executes a computer program.

The license information acquirer 404 is a functional unit that acquires license information representing the fact that the introduction application is licensed in accordance with a license information search request from the MFP 10. The license information acquirer 404 is implemented when the CPU 951 illustrated in FIG. 3 executes a computer program.

The storage 405 is a functional unit that stores various kinds of information such as information registered in the appliance by the appliance registration unit 403. The storage 405 is implemented by the auxiliary storage device 955 illustrated in FIG. 3.

Some or all of the tenant registration unit 402, the appliance registration unit 403, and the license information acquirer 404 of the common management server 40 illustrated in FIG. 5 may be implemented by a hardware circuit such as an FPGA or an ASIC instead of a computer program as software.

As illustrated in FIG. 5, the application market server 50 includes a communicator 501, an application information transmitter 502, and a storage 503.

The communicator 501 is a functional unit that performs data communication with the MFP 10 via the network N. The communicator 501 is implemented when the network I/F 959 and the CPU 951 illustrated in FIG. 3 execute a computer program.

The application information transmitter 502 is a functional unit that transmits, to the MFP 10, a list of applications as installation target at the time of introduction by appliance registration of the MFP 10 for the common management server 40 via the communicator 501 in accordance with an installation target application list acquisition request from the MFP 10. The application information transmitter 502 is implemented when the CPU 951 illustrated in FIG. 3 executes a computer program.

The storage 503 is a functional unit that stores information related to the application and the firmware that can be installed in the information processing device such as the MFP 10. The storage 503 is implemented by the auxiliary storage device 955 illustrated in FIG. 3.

The application information transmitter 502 of the application market server 50 illustrated in FIG. 5 may be implemented by a hardware circuit such as an FPGA or an ASIC instead of a computer program as software.

As illustrated in FIG. 5, the PC 80 includes a communicator 801, a target appliance searcher 802 (appliance searcher), an appliance information acquirer 803 (a fifth acquirer), an appliance registration requester 804, and a display controller 805.

The communicator 801 is a functional unit that performs data communication with the MFP 10 via the network N. The communicator 801 is implemented when the network I/F 959 and the CPU 951 illustrated in FIG. 3 execute a computer program.

The target appliance searcher 802 is a functional unit that searches for an information processing device included in an IP address range of the target appliance of installation of the applications and setting processing of the setting values designated by an operation input to the keyboard 961 and the mouse 962. The target appliance searcher 802 is implemented when the CPU 951 illustrated in FIG. 3 executes a computer program (the utility 81).

The appliance information acquirer 803 is a functional unit that acquires the appliance information including the serial number (an example of identification information) from the information processing device as the target appliance of installation of the applications and the setting processing of the setting values found by the target appliance searcher 802. The appliance information acquirer 803 is implemented when the CPU 951 illustrated in FIG. 3 executes a computer program (the utility 81).

The appliance registration requester 804 is a functional unit that transmits the appliance registration request including the tenant ID (an example of tenant information), the administrator ID, and the password input via the keyboard 961 and the mouse 962 to the common management server 40 via the communicator 801 together with the appliance information acquired by the appliance information acquirer 803. The appliance registration requester 804 is implemented when the CPU 951 illustrated in FIG. 3 executes a computer program (the utility 81).

The display controller 805 is a functional unit that performs display control for various screens displayed on the display 958. The display controller 805 is implemented when the CPU 951 illustrated in FIG. 3 executes a computer program (the utility 81).

Some or all of the target appliance searcher 802, the appliance information acquirer 803, and the appliance registration requester 804 of the PC 80 illustrated in FIG. 5 may be implemented by a hardware circuit such as an FPGA or an ASIC instead of a computer program as software.

The respective functional units of the MFP 10, the common management server 40, the application market server 50, and the PC 80 illustrated in FIG. 5 are merely conceptual, and are not limited to the configurations described above. For example, the functional units illustrated as independent functional units of the MFP 10, the common management server 40, the application market server 50, and the PC 80 illustrated in FIG. 5 may be configured as one functional unit. Alternatively, the function of one functional unit of the MFP 10, the common management server 40, the application market server 50, and the PC 80 illustrated in FIG. 5 may be divided into a plurality of functions, and may be configured as a plurality of functional units.

Figure 6A:
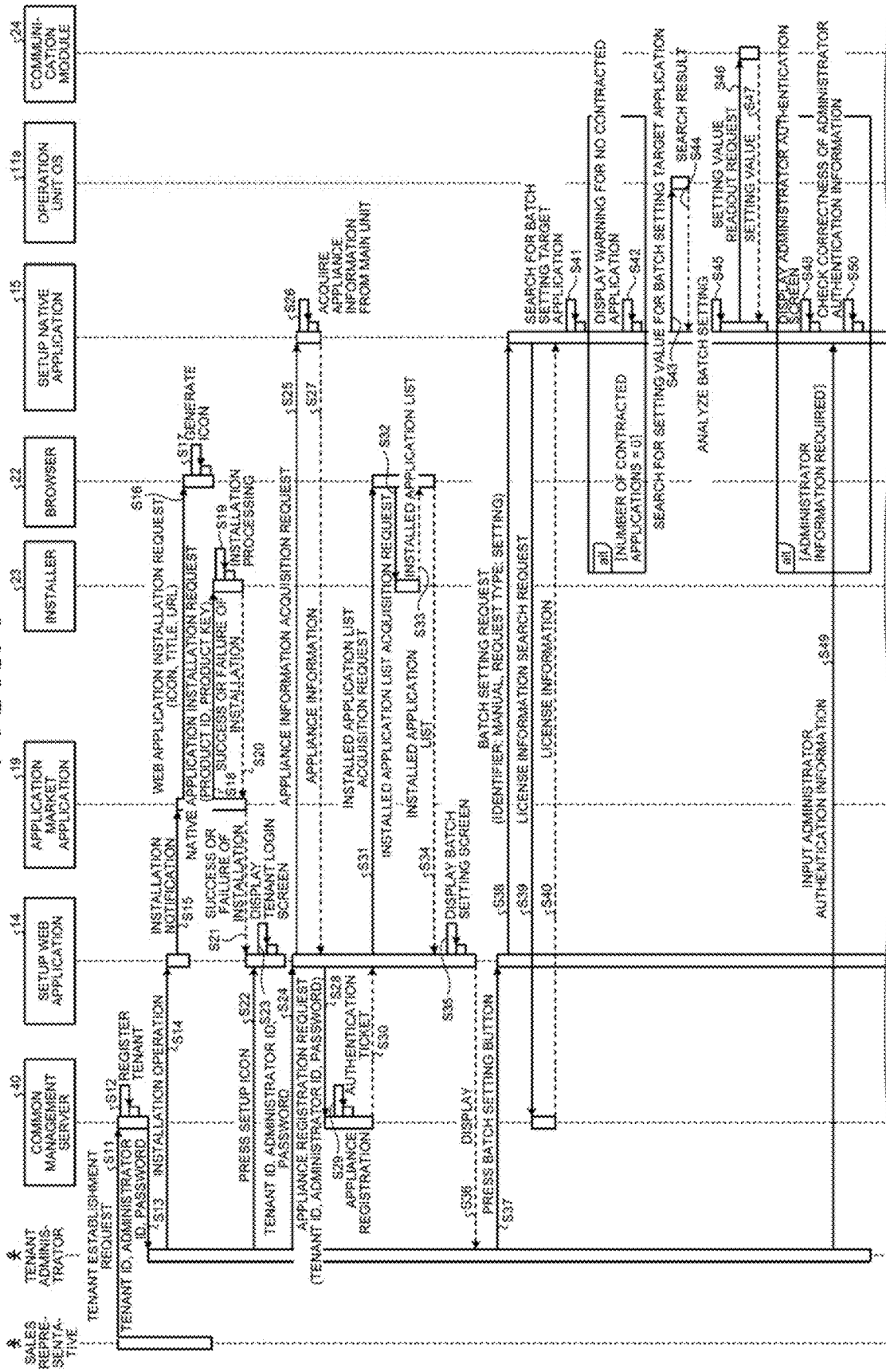
FIG. 6A is a sequence diagram illustrating an example of a procedure of installation and batch setting in a case in which a setup application is not installed in the appliance management system according to the first embodiment.
Figure 6B:
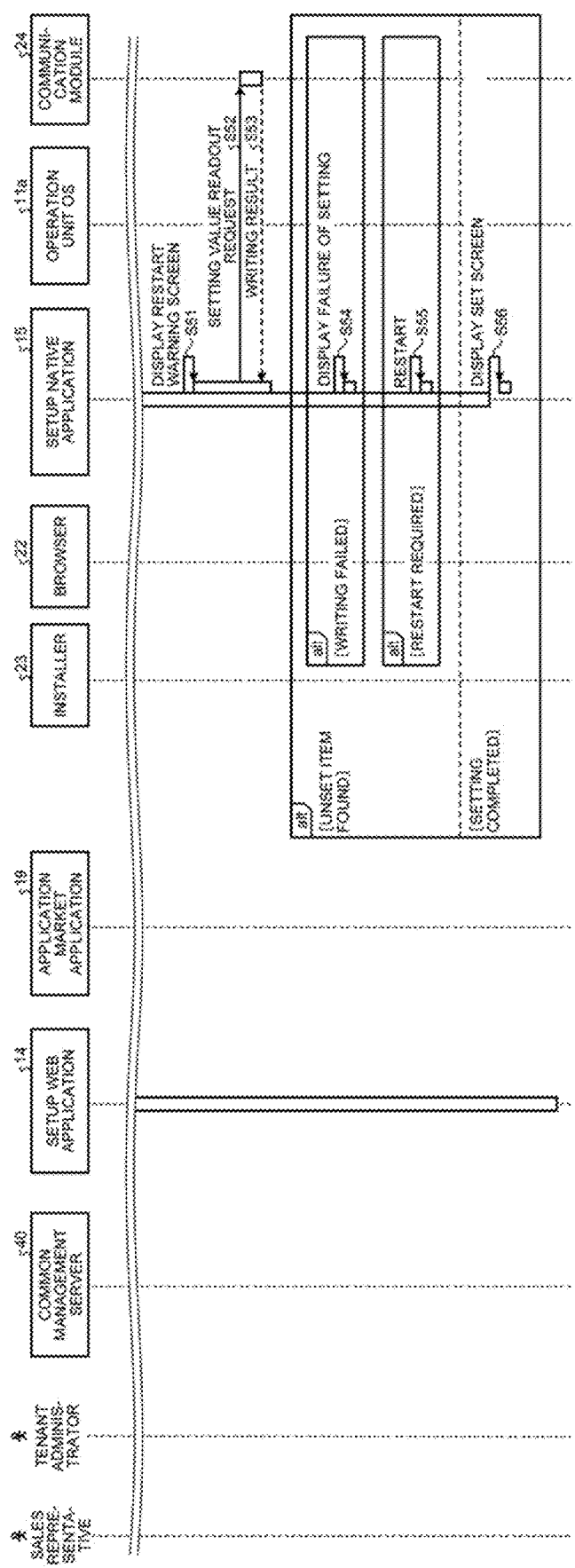
FIG. 6B is a sequence diagram illustrating an example of the procedure of installation and batch setting in a case in which the setup application is not installed in the appliance management system according to the first embodiment.
Figure 8:
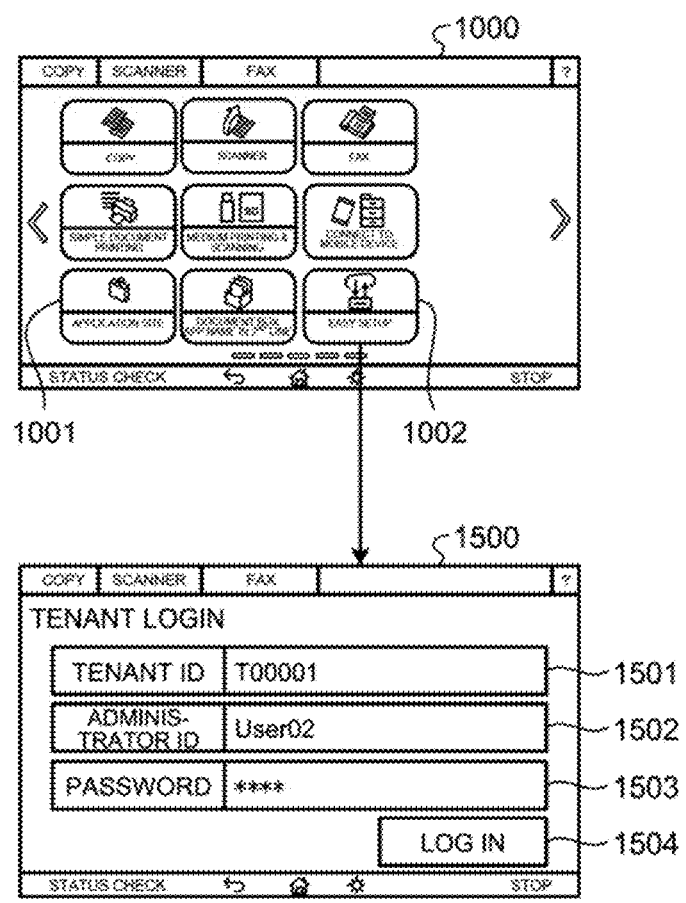
FIG. 8 is a diagram illustrating a flow of screen transition at the time of registering an appliance in the installation and batch setting in a case in which the setup application is not installed in the appliance management system according to the first embodiment.
Figure 9:
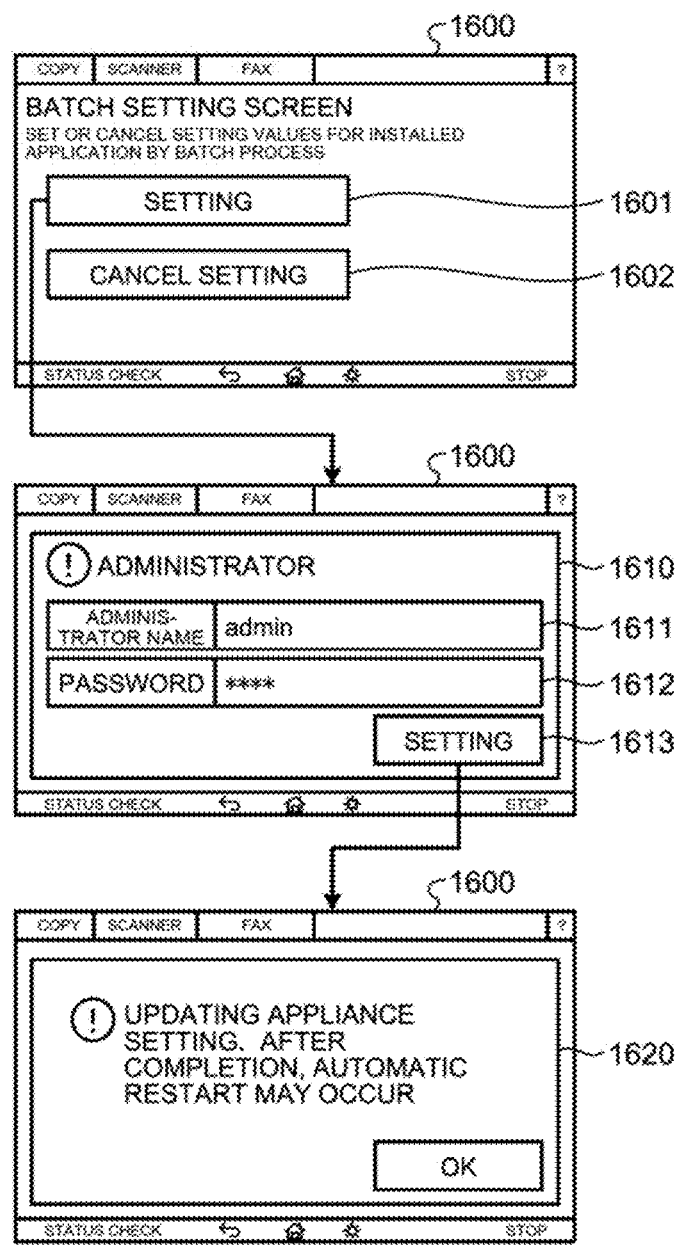
FIG. 9 is a diagram illustrating a flow of screen transition at the time of batch setting in the installation and batch setting in a case in which the setup application is not installed in the appliance management system according to the first embodiment.
Figure 10:
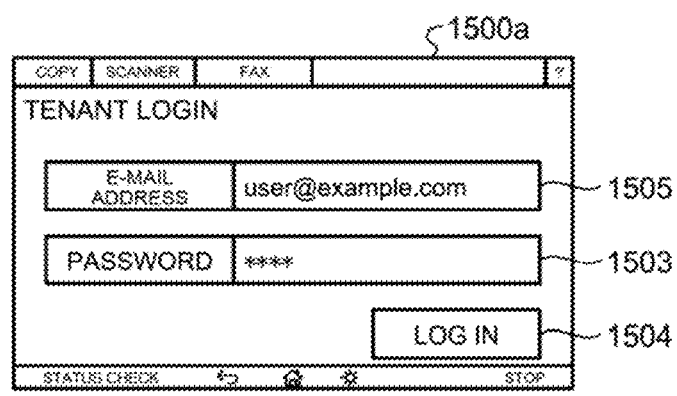
FIG. 10 is a diagram illustrating another example of a tenant login screen.

Installation and Batch Setting in Case in which Setup Application is not Installed FIG. 6A and FIG. 6B are sequence diagrams illustrating an example of a procedure of installation and batch setting in a case in which the setup application is not installed in the appliance management system according to the first embodiment. FIG. 7 is a diagram illustrating a flow of screen transition at the time of installing the application in the installation and batch setting in a case in which the setup application is not installed in the appliance management system according to the first embodiment. FIG. 8 is a diagram illustrating a flow of screen transition at the time of registering the appliance in the installation and batch setting in a case in which the setup application is not installed in the appliance management system according to the first embodiment. FIG. 9 is a diagram illustrating a flow of screen transition at the time of batch setting in the installation and batch setting in a case in which the setup application is not installed in the appliance management system according to the first embodiment. FIG. 10 is a diagram illustrating another example of the tenant login screen. FIG. 6A and FIG. 6B may be collectively referred to as FIG. 6. With reference to FIG. 6 to FIG. 10, the following describes the procedure of installation and batch setting when the setup application is not installed in the appliance management system 1 according to the present embodiment.

Steps S11 to S13

A sales representative who makes a contract for introducing a cloud service using the common management server 40 for a tenant as an organization that utilizes the MFP 10 perform registration work for the tenant on the common management server 40. The tenant registration unit 402 of the common management server 40 registers, in the storage 405, the tenant ID for identifying the tenant to which the MFP 10 belongs in accordance with the registration work for the tenant performed by the sales representative, for example. The tenant registration unit 402 registers the tenant ID, issues the administrator ID and the password, and notifies the tenant administrator of the tenant ID, the administrator ID, and the password using a given method (e-mail notification). Along with the registration of the tenant, the common management server 40 creates, in the storage 405 of the common management server 40, a storage region for storing and accumulating various kinds of information as a management target of the tenant such as user information, appliance information, and license information (described later) to be associated with the tenant information (tenant ID) of the tenant. Furthermore, along with the registration of the tenant, the common management server 40 generates, in a storage region of the device management server 20, a storage region for storing and accumulating appliance information and appliance output information for each piece of the appliance information (log information and setting value information for each information processing device) to be associated with the tenant information (tenant ID). The common management server 40 and the device management server 20 respectively include Web applications cooperating and linking with each other. The user and the tenant administrator can view various kinds of information associated with the tenant ID, make a setting, and make a processing execution request by displaying and logging in each Web application (Web site) using a Web browser of the terminal device such as the PC 80. The tenant may include various kinds of information associated with the tenant information, the storage region of the information, and the Web application for viewing information or making various settings (appliance registration, user registration, licensing) in addition to the tenant ID and the tenant name issued by a service person of a sales company in a certain country to the organization that utilizes the cloud service.

Steps S14 to S16

By an operation input to the operation panel 905 of the MFP 10 performed by the tenant administrator, the display controller 115 causes the operation panel 905 to display a home screen 1000 illustrated in FIG. 7. When the tenant administrator performs a touch operation on an application site icon 1001 on the home screen 1000, as illustrated in FIG. 7, the display controller 115 causes the operation panel 905 to display a list screen 1200 indicating a list of a plurality of applications and pieces of firmware that can be installed in the MFP 10.

The list screen 1200 is a screen that displays a list of a plurality of applications and pieces of firmware that can be installed in the MFP 10, and displays the list as a button icon for installing each of the applications and a button icon for installing each of the pieces of firmware. The applications displayed as button icons include a group application (an installation package. An application package including one or more applications) with which a plurality of applications can be collectively and successively installed using one button icon, and batch installation (described later) is performed by this mechanism. As illustrated in FIG. 7, the list screen 1200 includes a batch installation package button 1201 for installing applications (introduction applications) to be installed at the time of introduction by appliance registration of the information processing device such as the MFP 10 for the common management server 40 by batch. When the tenant administrator performs a touch operation on the batch installation package button 1201, as illustrated in FIG. 7, the display controller 115 causes the operation panel 905 to display an installation screen 1300 for installing the introduction application.

The installation screen 1300 is a screen for installing the introduction applications by batch, and includes an installation button 1301 for executing installation of the introduction applications, and package details 1303. In response to the tenant administrator's a touch operation on the installation button 1301, the installation controller 112, which is implemented by the CPU 901's executing the setup Web application 14 and the application market application 19 of the MFP 10, transmits an installation request for the Web application among the introduction applications (Web application installation request) to the icon generator 114. The Web application installation request includes icon information of the Web application, a title of the Web application, and a uniform resource locator (URL) indicating a place where the execution file of the Web application is stored. Hereinafter, a functional unit that is implemented when the CPU executes a specific computer program may be represented as a "functional unit of a specific computer program" in some cases. Specifically, when the tenant administrator performs a touch operation on the installation button 1301, the setup Web application 14 transmits an installation notification to the application market application 19. The application market application 19 then transmits the Web application installation request described above to the browser 22.

Step S17

After receiving the Web application installation request from the installation controller 112, the icon generator 114 of the browser 22 generates a shortcut icon that designates a path including the execution file of the Web application, in accordance with the icon information, the title, and the URL included in the Web application installation request.

Step S18

The installation controller 112 transmits, to the installer 113 of the installer 23, an installation request for the native application among the introduction applications (a native application installation request). The native application installation request includes a product ID and a product key of the native application.

Steps S19 to S21

When receiving the native application installation request from the installation controller 112, the installer 113 of the installer 23 receives an entity file (object file) of the native application from the application management server 60 based on the product ID and the product key included in the native application installation request. The installer 113 installs the native application using the entity file.

During installation processing performed by the installer 113, as illustrated in FIG. 7, the display controller 115 causes the operation panel 905 to display an installing dialog box 1400 indicating that the native application is being installed. The installer 113 then returns success or failure of the installation of the native application to the installation controller 112 of the application market application 19. The success or failure of the installation is transmitted from the application market application 19 to the setup Web application 14. When the installation is completed by the installer 113, as illustrated in FIG. 7, the display controller 115 causes the operation panel 905 to display the home screen 1000 to which a setup icon 1002 is added, the setup icon 1002 for performing setting processing of setting values for the introduction application.

Steps S22 and S23

When the tenant administrator performs a touch operation on the setup icon 1002, as illustrated in FIG. 8, the display controller 115 of the setup Web application 14 causes the operation panel 905 to display a tenant login screen 1500 for logging in based on the tenant ID.

The tenant login screen 1500 is a screen for logging in the MFP 10 using the tenant ID, the administrator ID, and the password notified from the common management server 40. As illustrated in FIG. 8, the tenant login screen 1500 includes a tenant ID input box 1501 for inputting the tenant ID, an administrator ID input box 1502 for inputting the administrator ID, a password input box 1503 for inputting the password, and a login button 1504 for executing a login.

Instead of inputting the tenant ID, the administrator ID, and the password on the tenant login screen 1500, an e-mail address and a password may be respectively input to an e-mail address input box 1505 and the password input box 1503 on a tenant login screen 1500a illustrated in FIG. 10. In this case, the e-mail address is assumed to correspond to the tenant ID and the administrator ID, and at Step S12 described above, information corresponding to the tenant ID may be registered based on the e-mail address of the tenant administrator, for example.

Steps S24 to S27

The tenant administrator inputs the tenant ID, the administrator ID, and the password respectively to the tenant ID input box 1501, the administrator ID input box 1502, and the password input box 1503 on the tenant login screen 1500 via the operation panel 905. The tenant administrator then performs a touch operation on the login button 1504.

The appliance information acquirer 102 of the setup Web application 14 then acquires appliance information of the main unit 12 (including the serial number of the MFP 10) from the main controller 121. Specifically, when the setup Web application 14 transmits the appliance information acquisition request to the setup native application 15, and the setup native application 15 acquires the appliance information from the main unit 12, the appliance information is returned to the setup Web application 14.

Step S28

The appliance registration requester 103 of the setup Web application 14 transmits the appliance registration request including the tenant ID, the administrator ID, and the password input via the operation panel 905 to the common management server 40 together with the appliance information acquired by the appliance information acquirer 102 via the communicator 101.

Step S29

When receiving the appliance registration request from the MFP 10 via the communicator 401, the appliance registration unit 403 of the common management server 40 performs authentication using the administrator ID and the password included in the appliance registration request. If authentication is normally performed, the appliance registration unit 403 searches tenant IDs registered by the tenant registration unit 402 for a tenant ID matching the tenant ID for identifying the tenant included in the appliance registration request, and associates the found tenant ID with the information (serial number) for identifying the MFP 10 as the appliance information to perform appliance registration.

The appliance registration unit 403 causes the storage 405 to store information associating the tenant ID with the serial number.

Step S30

The appliance registration unit 403 then transmits an authentication ticket issued by the authentication described above to the MFP 10 via the communicator 401.

Steps S31 to S34

When receiving the authentication ticket from the common management server 40 via the communicator 101, the installed application list acquirer 104 of the operation unit 11 acquires a list of applications that have been already installed in the operation unit 11 (a list of the identification information of the applications) based on the authentication ticket. Specifically, the setup Web application 14 transmits the installed application list acquisition request to the browser 22, and the browser 22 transmits the installed application list acquisition request to the installer 23. When receiving the installed application list acquisition request, the installer 23 acquires the list of the applications that have been already installed in the operation unit 11, and transmits the list to the browser 22. The browser 22 transmits the installed application list received from the installer 23 to the setup Web application 14.

Steps S35 and S36

The display controller 115 of the setup Web application 14 causes the operation panel 905 to display a batch setting screen 1600 illustrated in FIG. 9.

The batch setting screen 1600 is a screen for performing setting processing of the setting values related to installed introduction application by batch. The batch setting screen 1600 includes a batch setting button 1601 for performing batch setting of the setting values, and a batch setting cancellation button 1602 for canceling the set setting values by batch.

Steps S37 and S38

When the tenant administrator performs a touch operation on the batch setting button 1601 via the operation panel 905, the installation controller 112 of the setup Web application 14 transmits a batch setting request having an identifier of "manual" and a request type of "setting" to the license checker 110 of the setup native application 15.

Steps S39 and S40

When receiving the batch setting request, the license checker 110 of the setup native application 15 transmits a license information search request for checking presence/absence of a license for the installed introduction application to the common management server 40 via the communicator 101. When receiving the license information search request via the communicator 401, the license information acquirer 404 of the common management server 40 acquires license information representing whether the introduction application has been licensed. The license information acquirer 404 transmits the acquired license information to the MFP 10 via the communicator 401. The license information is information for certifying purchase, a subscription, or a contract for the application by the tenant administrator for each tenant, and includes information representing the number of appliances and the number of users who can use the contracted application. The license information search request is issued for checking the license information currently permitted for the information processing device 10 by transmitting, to the common management server 40 from the information processing device 10, the authentication ticket and machine number information issued from the common management server 40 and acquired by the information processing device 10.

Step S41

When receiving the license information from the common management server 40 via the communicator 101, the target searcher 106 of the setting controller 105 of the setup native application 15 searches for a licensed application from among the installed introduction applications based on the license information.

Step S42

With no licensed application found among the introduction applications found by the target searcher 106, the display controller 115 of the setup native application 15 causes the operation panel 905 to display a message, a screen, or the like for warning that there is no application under a license contract.

Steps S43 and S44

The setting value list acquirer 107 of the setting controller 105 of the setup native application 15 searches for whether the introduction application includes setting data (or whether the setting data of the introduction application includes a setting value that should be set) via an operation unit OS 11a as an operating system (OS) of the operation unit 11 regarding the setting data (setting file) defining a list of setting values in an extensible Markup Language (XML) format, for example, included in the introduction application (for example, the job log transmission application 16, the appliance management application 17, and the authentication application 18), and acquires the found setting data as a search result. This is an example of an introduced application being the native application, and is effective since the native application can be downloaded into the information processing device together with the setting file. On the other hand, in a case in which the introduced application is a Web application not including the native application, the setting value list acquirer 107 may make a request for the setting data to the Web application via a network to acquire the setting data. Due to this, even if each introduction application has a setting value that should be set for the information processing device, the setting value for the information processing device is enabled to be rewritten by causing the introduction application to have the information thereof, so that time and effort for individually and manually changing the setting value can be saved.

Step S45

The setting controller 105 of the setup native application 15 analyzes content of the setting data acquired by the setting value list acquirer 107.

Steps S46 and S47

The set value reader 108 of the setting controller 105 of the setup native application 15 reads out the current setting values of the application at the time of introduction, from the main unit 12 via the communication module 24.

Step S48

Next, when administrator authority is required for writing the setting value into the main unit 12, as illustrated in FIG. 9, the display controller 115 of the setup native application 15 causes the operation panel 905 to display an administrator authentication screen 1610.

The administrator authentication screen 1610 is a screen for performing administrator authentication by the administrator of the information processing device (different from the tenant administrator) that is required for writing the setting value into the main unit 12 independent of the administrator ID and the password described above notified from the common management server 40. The administrator authentication screen 1610 includes an administrator name input box 1611 for inputting an administrator name, a password input box 1612 for inputting a password, and a setting button 1613 for executing authentication setting.

Step S49

The tenant administrator inputs an administrator name and a password as the administrator authentication information respectively to the administrator name input box 1611 and the password input box 1612 on the administrator authentication screen 1610 via the operation panel 905, and performs a touch operation on the setting button 1613.

Step S50

The setting controller 105 (an example of an authenticator) of the setup native application 15 performs administrator authentication based on the input administrator name and password. With a failure of the administrator authentication, the process stops without execution of the following processing. In this way, the setting controller 105 performs authentication of the tenant administrator before batch setting (writing processing) to the setting values, to be able to perform the batch setting to the setting values under the supervision of the tenant administrator.

Step S51

With an unset item found in the setting values read by the set value reader 108, as illustrated in FIG. 9, the display controller 115 of the setup native application 15 causes the operation panel 905 to display a restart warning dialog box 1620 for warning that a restart may be performed when a new setting value is written. In this way, by previously notifying the tenant administrator of possibility of a restart, an unintended restart can be prevented from being caused during the batch setting of the setting values.

Steps S52 and S53

In a case in which the tenant administrator is aware of the warning and performs a touch operation on an OK button of the restart warning dialog box 1620, the setting value writer 109 of the setting controller 105 of the setup native application 15 transmits a setting value writing request for writing the setting data acquired by the setting value list acquirer 107 as the setting value for the introduction application to the main unit 12 together with the setting data via the communication module 24. When receiving the setting value writing request, the main unit 12 writes the setting value corresponding to the unset item in the setting data into the storage 914 to be updated. The main unit 12 then transmits a writing result of the setting value to the setting value writer 109 via the communication module 24.

Step S54

In a case in which the writing result transmitted from the main unit 12 indicates a failure, the display controller 115 of the setup native application 15 causes the operation panel 905 to display a message or a screen indicating that writing of the setting value failed.

Step S55

In a case in which there is a setting value requiring a restart in the setting values written in the main unit 12, the setting controller 105 of the setup native application 15 restarts the MFP 10.

Step S56

With no unset item found in the setting values read by the set value reader 108, the display controller 115 of the setup native application 15 causes the operation panel 905 to display a message or a screen indicating that the setting values have been already set for the introduction application.

Through the procedures at Steps S11 to S56 described above, when the introduction application is installed, the information processing device such as the MFP 10 can be registered in the cloud (common management server 40) by appliance registration, and the setting values for the introduction application can be set by batch, so that the cloud service using the common management server 40 can be easily associated with the information processing device (appliance) such as the MFP 10, and time and effort for preparation for receiving provision of the cloud service can be reduced.

Application Start Processing after Installation and Batch Setting

Figure 11:
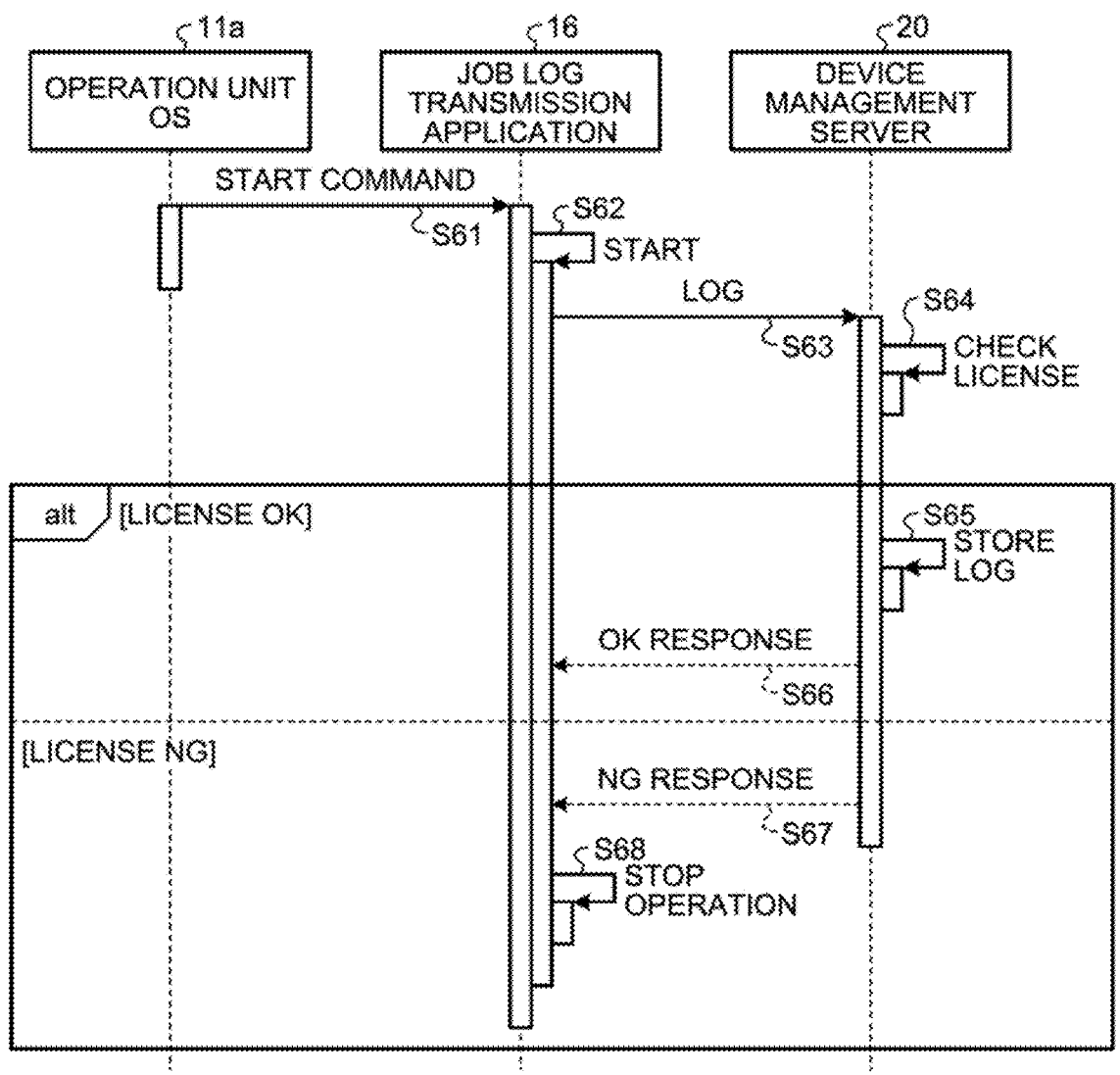
FIG. 11 is a sequence diagram illustrating an example of a procedure of application start processing after the installation and batch setting in the appliance management system according to the first embodiment.

FIG. 11 is a sequence diagram illustrating an example of a procedure of application start processing after the installation and batch setting in the appliance management system according to the first embodiment. With reference to FIG. 11, the following describes the procedure of application start processing after the installation and batch setting in the appliance management system 1 according to the present embodiment.

Step S61

After the installation and batch setting illustrated in FIG. 6 described above ends, the operation unit OS 11a of the operation unit 11 transmits a start command for automatically starting the introduction application. The following describes an operation of the job log transmission application 16 as the introduction application.

Steps S62 and S63

The job log transmission application 16 automatically starts in accordance with the start command from the operation unit OS 11a. The job log transmission application 16 then starts to collect a log related to the operation of the main unit 12 generated by the log generation module 26 via the communication module 24. The job log transmission application 16 then transmits the collected log to the device management server 20.

Step S64

When receiving the log from the job log transmission application 16, the device management server 20 checks whether the job log transmission application 16 is a licensed application. For example, the device management server 20 makes an inquiry to the common management server 40 whether the job log transmission application 16 is a licensed application.

Steps S65 and S66

When finding that the job log transmission application 16 is a licensed application, the device management server 20 stores the received log in the auxiliary storage device 955 of itself. The device management server 20 then returns, to the job log transmission application 16 of the MFP 10, an OK response indicating that the job log transmission application 16 is a licensed application and the log is completely stored.

Steps S67 and S68

When failing to find that the job log transmission application 16 is a licensed application, the device management server 20 discards the received log, and returns, to the job log transmission application 16 of the MFP 10, an NG (no good) response indicating that the job log transmission application 16 is not a licensed application. After receiving the NG response, the job log transmission application 16 determines that it is not appropriate to continue the operation since the application is not licensed, and stops the operation.

The other introduction applications (the appliance management application 17, the authentication application 18) also automatically start in accordance with the start command from the operation unit OS 11a, and perform respective operations.

Batch Setting Cancellation and Uninstallation Processing

Figure 12:
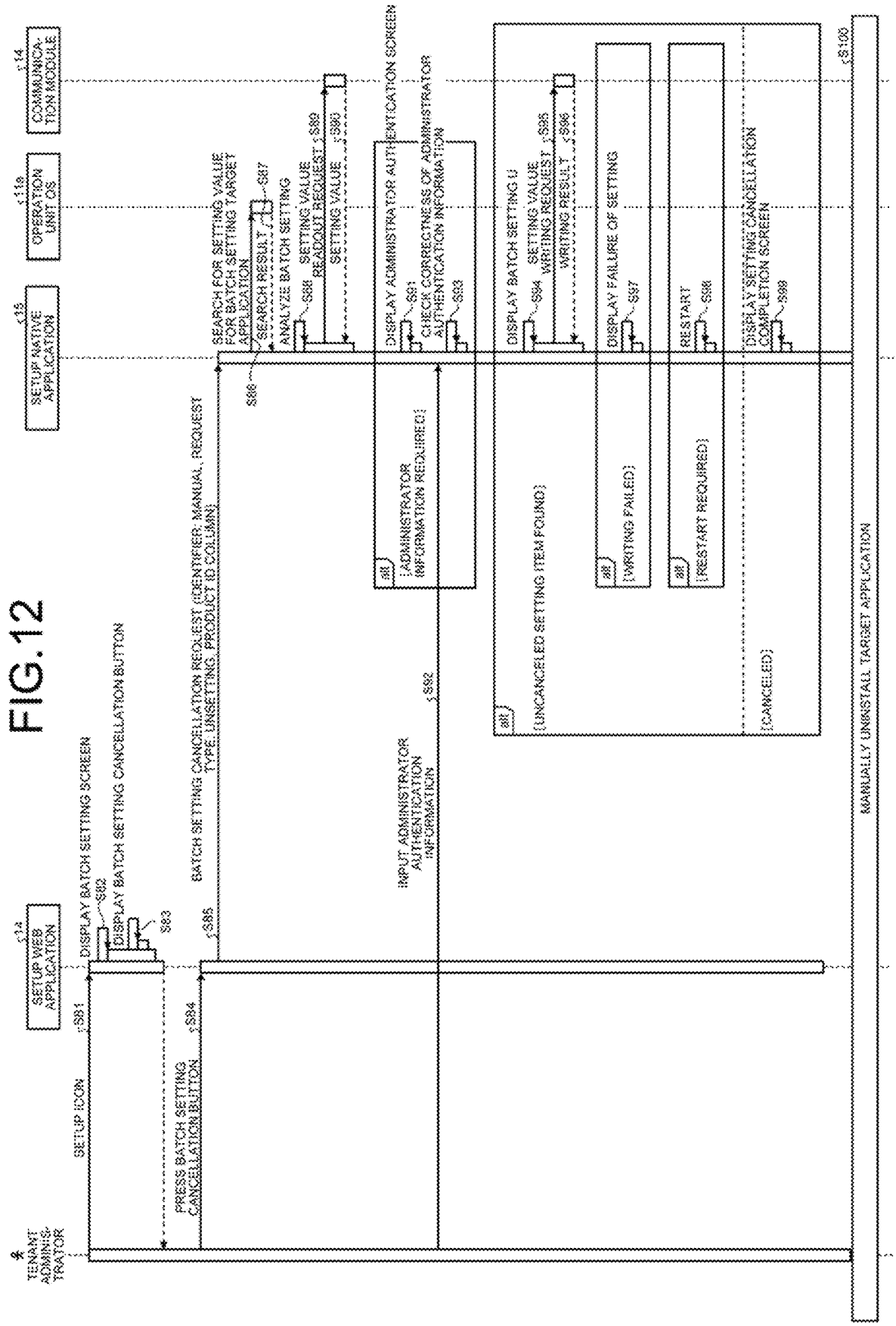
FIG. 12 is a sequence diagram illustrating an example of a procedure of batch setting cancellation and uninstallation processing in the appliance management system according to the first embodiment.

FIG. 12 is a sequence diagram illustrating an example of a procedure of batch setting cancellation and uninstallation processing in the appliance management system according to the first embodiment. With reference to FIG. 12, the following describes the procedure of batch setting cancellation and uninstallation processing in the appliance management system 1 according to the present embodiment. It is assumed that the installation and batch setting illustrated in FIG. 6 described above is performed before the batch setting cancellation and uninstallation processing illustrated in FIG. 12 is performed.

Steps S81 to S83

First, the tenant administrator performs a touch operation on the setup icon 1002 on the home screen 1000 illustrated in FIG. 8. The display controller 115 of the setup Web application 14 then causes the operation panel 905 to display the batch setting screen 1600 illustrated in FIG. 9. As illustrated in FIG. 9, the batch setting screen 1600 includes the batch setting cancellation button 1602 for canceling the set setting values by batch.

Steps S84 and S85

When the tenant administrator performs a touch operation on the batch setting cancellation button 1602 via the operation panel 905, the installation controller 112 of the setup Web application 14 transmits a batch setting cancellation request having the identifier of "manual" and the request type of "unsetting", and including a column of the product ID of the introduction application to the setting controller 105 of the setup native application 15.

Steps S86 and S87

The setting value list acquirer 107 of the setting controller 105 of the setup native application 15 searches for setting data defining a list of the setting values in an XML format, for example, included in the introduction application via the operation unit OS 11a as the OS of the operation unit 11, and acquires the found setting data as a search result.

Step S88

The setting controller 105 of the setup native application 15 analyzes content of the setting data acquired by the setting value list acquirer 107.

Steps S89 and S90

The set value reader 108 of the setting controller 105 of the setup native application 15 reads out the current setting values of the application at the time of introduction from the main unit 12 via the communication module 24.

Step S91

Next, when administrator authority is required for writing the setting value into the main unit 12, as illustrated in FIG. 9, the display controller 115 of the setup native application 15 causes the operation panel 905 to display the administrator authentication screen 1610.

Step S92

The tenant administrator inputs the administrator name and the password as the administrator authentication information respectively to the administrator name input box 1611 and the password input box 1612 on the administrator authentication screen 1610 via the operation panel 905, and performs a touch operation on the setting button 1613.

Step S93

The setting controller 105 (an example of an authenticator) of the setup native application 15 performs administrator authentication based on the input administrator name and password. With a failure of the administrator authentication, the process stops without execution of the following processing. In this way, the setting controller 105 performs authentication of the tenant administrator before batch setting cancellation processing (writing processing) to the setting values, to be able to perform the batch setting cancellation processing to the setting values under supervision of the tenant administrator.

Step S94

With a not-canceled setting item found among the setting values read by the set value reader 108, as illustrated in FIG. 9, the display controller 115 of the setup native application 15 causes the operation panel 905 to display the restart warning dialog box 1620 for warning that a restart may be performed when a new setting value is written.

Steps S95 and S96

In a case in which the tenant administrator is aware of the warning and performs a touch operation on the OK button of the restart warning dialog box 1620, the setting value writer 109 of the setting controller 105 of the setup native application 15 transmits a setting value writing request for performing setting cancellation by writing the setting value that has been set at the time of introduction read out by the set value reader 108 at Step S47 illustrated in FIG. 6 to the main unit 12 together with the setting value via the communication module 24. When receiving the setting value writing request, the main unit 12 writes the setting value corresponding to the not-canceled setting item among the setting values into the storage 914 to be updated. The main unit 12 then transmits a writing result of the setting value to the setting value writer 109 via the communication module 24.

Step S97

In a case in which the writing result transmitted from the main unit 12 indicates a failure, the display controller 115 of the setup native application 15 causes the operation panel 905 to display a message or a screen indicating that writing of the setting value failed.

Step S98

In a case in which there is a setting value requiring a restart in the setting values written in the main unit 12, the setting controller 105 of the setup native application 15 restarts the MFP 10.

Step S99

With no not-canceled setting item found in the setting values read by the set value reader 108, the display controller 115 of the setup native application 15 causes the operation panel 905 to display a setting cancellation completion screen indicating that setting cancellation has been already performed on the setting values for the introduction application.

Step S100

The tenant administrator then performs an operation on the operation panel 905 to uninstall the introduction application from the home screen 1000 and the list screen 1200 illustrated in FIG. 7.

Manual Installation and Batch Setting to Install Setup Application

FIG. 13A and FIG. 13B are sequence diagrams illustrating an example of a procedure of manual installation and batch setting when the setup application is installed in the appliance management system according to the first embodiment. FIG. 14 is a diagram illustrating a flow of screen transition at the time of installation and batch setting of the application during the installation and batch setting process when the setup application is installed in the appliance management system according to the first embodiment. FIG. 13A and FIG. 13B may be collectively referred to as FIG. 13. With reference to FIG. 13 and FIG. 14, the following describes the procedure of manual installation and batch setting in a case in which the setup application is installed in the appliance management system 1 according to the present embodiment.

Steps S111 to S113

The pieces of processing at Steps S111 to S113 are the same as the respective pieces of processing at Steps S11 to S13 illustrated in FIG. 6.

Steps S114 and S115

When the tenant administrator performs a touch operation on the setup icon 1002 of the home screen 1000 illustrated in FIG. 8, as illustrated in FIG. 8, the display controller 115 of the setup Web application 14 causes the operation panel 905 to display the tenant login screen 1500 based on the tenant ID.

Steps S116 to S122

The pieces of processing at Steps S116 to S122 are the same as the respective pieces of processing at Steps S24 to S30 illustrated in FIG. 6.

Step S123

When the installed application list acquirer 104 of the operation unit 11 receives the authentication ticket from the common management server 40 via the communicator 101, the display controller 115 of the setup Web application 14 causes the operation panel 905 to display the batch setting screen 1600 illustrated in FIG. 14.

Steps S124 and S125

When the tenant administrator performs a touch operation on the batch setting button 1601 (installation and batch setting button) via the operation panel 905, the installation controller 112 of the setup Web application 14 transmits an installation notification including the authentication ticket to the application market application 19.

Steps S126 and S127

When receiving the installation notification, the installation target application list acquirer 111 of the application market application 19 acquires, from the application market server 50, a list of the applications (a list of the identification information of the applications) to be installed at the time of introduction by appliance registration of the MFP 10 for the common management server 40. In this case, the common management server 40 checks whether the introduction applications are licensed, and transmits a list of licensed introduction applications to the MFP 10. Specifically, the application market application 19 transmits the installation target application list acquisition request including the authentication ticket to the application market server 50, and the application market server 50 transmits, after receiving the installation target application list acquisition request, the list of the introduction applications to the application market application 19.

Step S128

The installation controller 112 of the application market application 19 transmits an installation request for the Web application (Web application installation request) among the introduction applications to the icon generator 114. The Web application installation request includes icon information of the Web application, a title of the Web application, and a URL indicating a place where an execution file of the Web application is stored.

Step S129

When receiving the Web application installation request from the installation controller 112, the icon generator 114 of the browser 22 generates a shortcut icon for designating a path including the execution file of the Web application, according to the icon information, the title, and the URL included in the Web application installation request.

Step S130

The installation controller 112 transmits, to the installer 113 of the installer 23, an installation request for the native application (native application installation request) among the introduction applications. The native application installation request includes a product ID and a product key of the native application.

Steps S131 and S132

When receiving the native application installation request from the installation controller 112, the installer 113 of the installer 23 receives an entity file (object file) of the native application from the application management server 60 based on the product ID and the product key included in the native application installation request. The installer 113 installs the native application using the entity file.

During installation processing performed by the installer 113, as illustrated in FIG. 14, the display controller 115 causes the operation panel 905 to display an installing dialog box 1630 indicating that the native application is being installed. The installer 113 then returns success or failure of the installation of the native application to the installation controller 112 of the application market application 19.

Steps S133 and S134

In a case in which the installation performed by the installer 113 failed, the installer 113 of the installer 23 causes the operation panel 905 to display a screen indicating that the installation failed. The tenant administrator performs a touch operation on a close button of the screen displayed on the operation panel 905, and does not perform the following batch setting of the setting values and ends the process since installation of the introduction application failed.

Step S135

In a case in which installation performed by the installer 113 has succeeded, the installation controller 112 of the application market application 19 transmits a batch setting request having the identifier of "manual" and the request type of "setting", and including a column of the product ID of the introduction application to the setting controller 105 of the setup native application 15. Whether the introduction applications are licensed is checked at Step S126 and S127, so that the processing at Steps S39 and S40 illustrated in FIG. 6 are skipped.

Steps S136 to S140

The pieces of processing at Steps S136 to S140 are the same as the respective pieces of processing at Steps S43 to S47 illustrated in FIG. 6.

Steps S141 to S146

The pieces of processing at Steps S141 to S146 are the same as the respective pieces of processing at Steps S51 to S56 illustrated in FIG. 6.

Step S147

Irrespective of presence/absence of the unset item among the setting values read by the set value reader 108, with an application without license contract found among the introduction applications at Steps S126 and S127, the display controller 115 of the setup native application 15 causes the operation panel 905 to display a message or a screen for warning for no application with a license contract.

Through the procedures at Steps S111 to S147 described above, the information processing device such as the MFP 10 can be registered in the cloud (common management server 40) through appliance registration, the introduction application can be automatically installed, and the setting values for the introduction application can be set by batch as long as the setup application is installed in advance at the time of factory shipment. Thereby, it is possible to easily associate the cloud service using the common management server 40 with the information processing device (appliance) such as the MFP 10, and reduce time and effort for preparation for receiving provision of the cloud service.

Uninstallation and Batch Setting Cancellation Processing

FIG. 15A and FIG. 15B are sequence diagrams illustrating an example of a procedure of uninstallation and batch setting cancellation processing in the appliance management system according to the first embodiment. With reference to FIG. 15, the following describes the procedure of uninstallation and batch setting cancellation processing in the appliance management system 1 according to the present embodiment. FIG. 15A and FIG. 15B may be collectively referred to as FIG. 15. It is assumed that the installation and batch setting illustrated in FIG. 13 described above is performed before the uninstallation and batch setting cancellation processing illustrated in FIG. 15 is performed.

Steps S151 to S153

The pieces of processing at Steps S151 to S153 are the same as the respective pieces of processing at Steps S81 to S83 illustrated in FIG. 12.

Steps S154 and S155

When the tenant administrator performs a touch operation on the batch setting cancellation button 1602 of the batch setting screen 1600 via the operation panel 905, the installation controller 112 of the setup Web application 14 transmits a batch uninstallation request to the application market application 19.

Step S156

The installation controller 112 of the application market application 19 transmits a batch setting instructed application list acquisition request for making a request for a list of applications on which setting processing of the setting values has been performed to the installed application list acquirer 104 of the setup native application 15.

Step S157

When receiving the batch setting instructed application list acquisition request, the installed application list acquirer 104 of the setup native application 15 returns the column of the product ID of the introduction applications on which setting processing of the setting values has been completely performed to the installation controller 112 of the application market application 19.

Step S158

The installation controller 112 then transmits an uninstallation request for the native application (native application uninstallation request) among the introduction applications to the installer 113 of the installer 23. The native application uninstallation request includes a column of the product ID of the native application.

Steps S159 and S160

When receiving the native application uninstallation request from the installation controller 112, the installer 113 of the installer 23 uninstalls the native application based on the column of the product ID included in the native application uninstallation request. The installer 113 then returns success or failure of the uninstallation of the native application to the installation controller 112 of the application market application 19.

Steps S161 and S162

In a case in which the uninstallation performed by the installer 113 failed, the installer 113 of the installer 23 causes the operation panel 905 to display a screen indicating that the uninstallation failed. The tenant administrator performs a touch operation on a close button of the screen displayed on the operation panel 905, and does not perform the following batch setting cancellation processing of the setting values and ends the process since the uninstallation of the introduction application failed.

Step S163

In a case in which the uninstallation performed by the installer 113 has succeeded, the installation controller 112 of the setup Web application 14 transmits a batch setting cancellation request having the identifier of "manual" and the request type of "unsetting", and including the column of the product ID of the introduction applications to the setting controller 105 of the setup native application 15.

Step S164

When receiving the batch setting cancellation request, the setting controller 105 of the setup native application 15 analyzes content of the setting values for the introduction applications in a current state.

Steps S165 and S166

The set value reader 108 of the setting controller 105 of the setup native application 15 reads out the current setting values of the introduction applications from the main unit 12 via the communication module 24.

Steps S167 to S172

The processing at Steps S167 to S172 are the same as the respective pieces of processing at Steps S94 to S99 illustrated in FIG. 12.

Figure 16A:
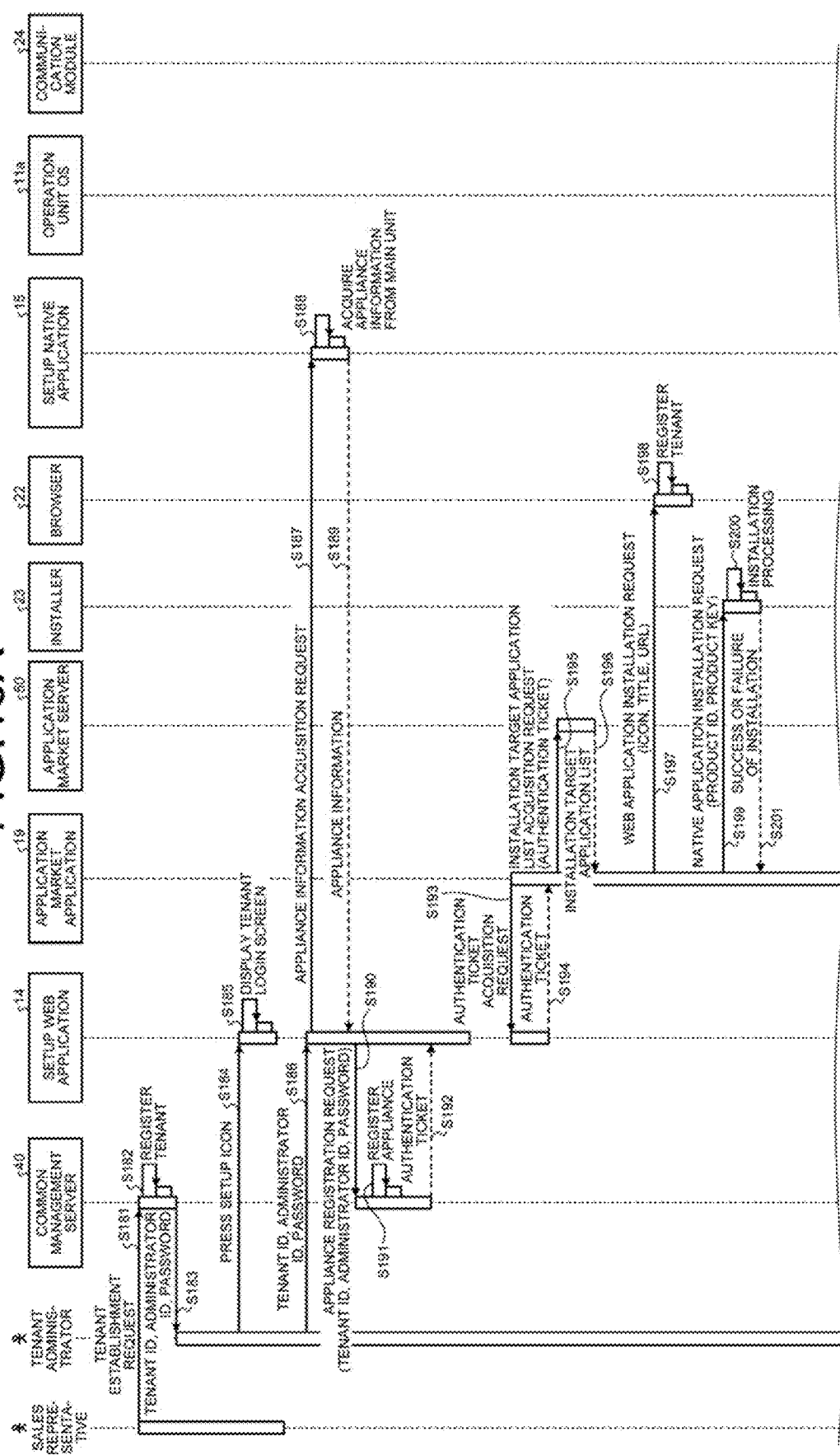
FIG. 16A is a sequence diagram illustrating an example of a procedure of automatic installation and batch setting in a case in which the setup application is installed in the appliance management system according to the first embodiment.
Figure 16B:
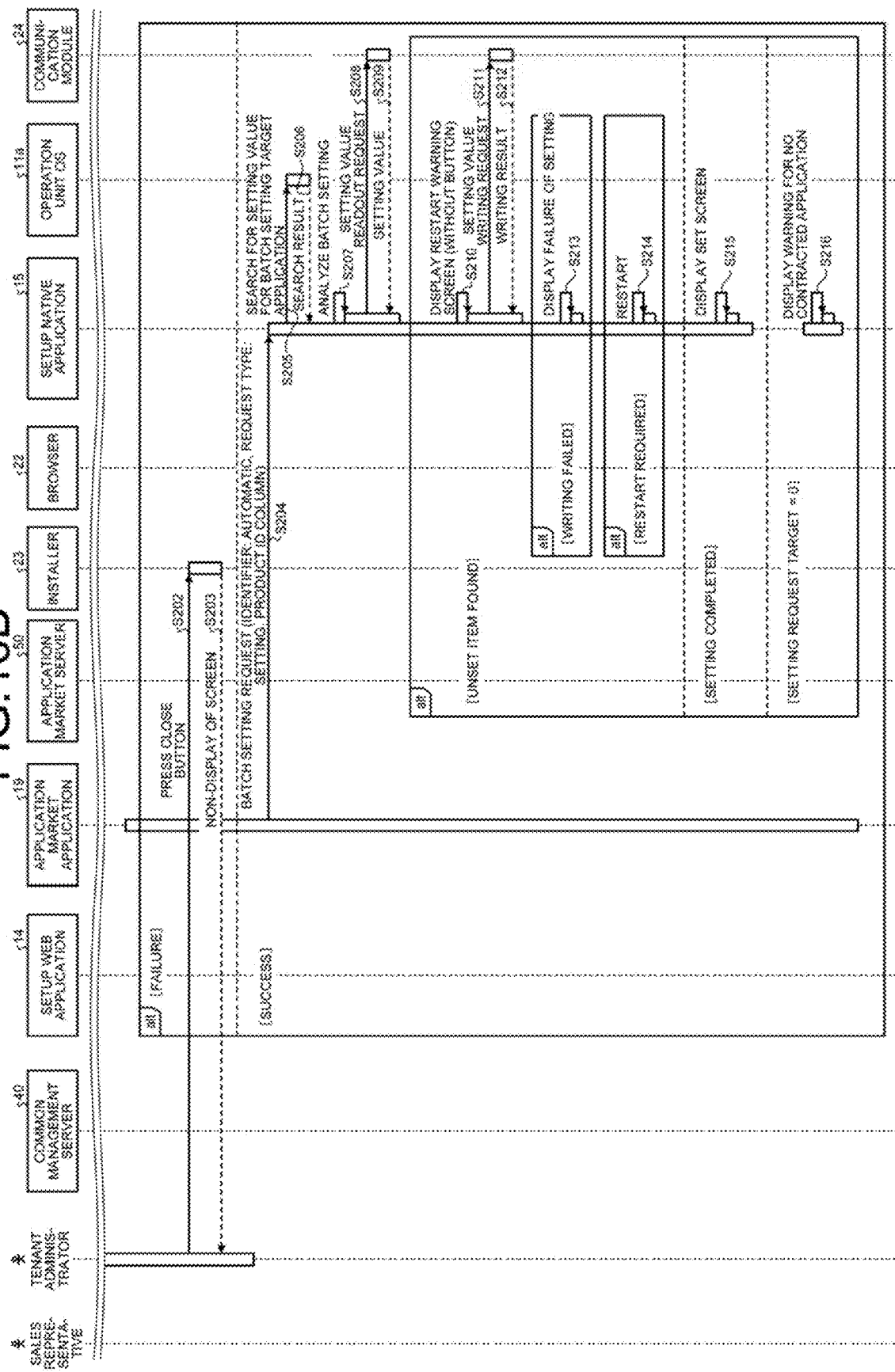
FIG. 16B is a sequence diagram illustrating an example of the procedure of automatic installation and batch setting in a case in which the setup application is installed in the appliance management system according to the first embodiment.

Automatic Installation and Batch Setting in Case in which Setup Application is Installed FIG. 16A and FIG. 16B are sequence diagrams illustrating an example of a procedure of automatic installation and batch setting in a case in which the setup application is installed in the appliance management system according to the first embodiment. FIG. 16A and FIG. 16B may be collectively referred to as FIG. 16. With reference to FIG. 16, the following describes the procedure of automatic installation and batch setting in a case in which the setup application is installed in the appliance management system 1 according to the present embodiment.

Steps S181 to S192

The pieces of processing at Steps S181 to S192 are the same as the respective pieces of processing at Steps S111 to S122 illustrated in FIG. 13. Described herein is the automatic installation and batch setting, so that display of the batch setting screen 1600 at Step S123 in the manual installation and batch setting illustrated in FIG. 13 is skipped.

Steps S193 and S194

The application market application 19 transmits an authentication ticket acquisition request for making a request for the authentication ticket to the setup Web application 14. The setup Web application 14 then transmits the authentication ticket acquired at Step S192 to the application market application 19.

Steps S195 to S209

The pieces of processing at Steps S195 to S209 are the same as the respective pieces of processing at Steps S126 to S140 illustrated in FIG. 13. However, at Step S204, it is assumed that the batch setting request transmitted to the setting controller 105 by the installation controller 112 has the identifier of "automatic" and the request type of "setting", and includes the column of the product ID of the introduction applications.

Step S210

With an unset item found in the setting values read out by the set value reader 108, as illustrated in FIG. 14, the display controller 115 of the setup native application 15 causes the operation panel 905 to display the restart warning dialog box 1620 for warning that a restart may be performed when a new setting value is written. However, described herein is the automatic installation and batch setting, so that it is assumed that the OK button for closing the dialog box as in the restart warning dialog box 1620 at Step S141 in the manual installation and batch setting illustrated in FIG. 13 is not displayed. In this case, the display controller 115 may close the restart warning dialog box 1620 after a certain time has elapsed after displaying the restart warning dialog box 1620, for example.

Steps S211 to S216

The pieces of processing at Steps S211 to S216 are the same as the respective pieces of processing at Steps S142 to S147 illustrated in FIG. 13.

Through the procedures at Steps S181 to S216 described above, in a case in which the setup application is installed in advance at the time of factory shipment, the information processing device such as the MFP 10 can be registered in the cloud (common management server 40) by appliance registration, the introduction application can be automatically installed, and the setting values for the introduction application can be set by batch. Due to this, the cloud service using the common management server 40 can be easily associated with the information processing device (appliance) such as the MFP 10, and time and effort for preparation for receiving provision of the cloud service can be reduced. Additionally, as compared with the manual installation and batch setting illustrated in FIG. 13 described above, a press operation (touch operation) for some buttons is skipped, so that time and effort for preparation for receiving provision of the cloud service can be further reduced.

The operation may be performed in any one of the manual installation and batch setting illustrated in FIG. 13 and the automatic installation and batch setting illustrated in FIG. 16, or the operation may be switched in accordance with a setting value for switching between the manual installation and batch setting and the automatic installation and batch setting.

Remote Installation and Batch Setting

Figure 17A:
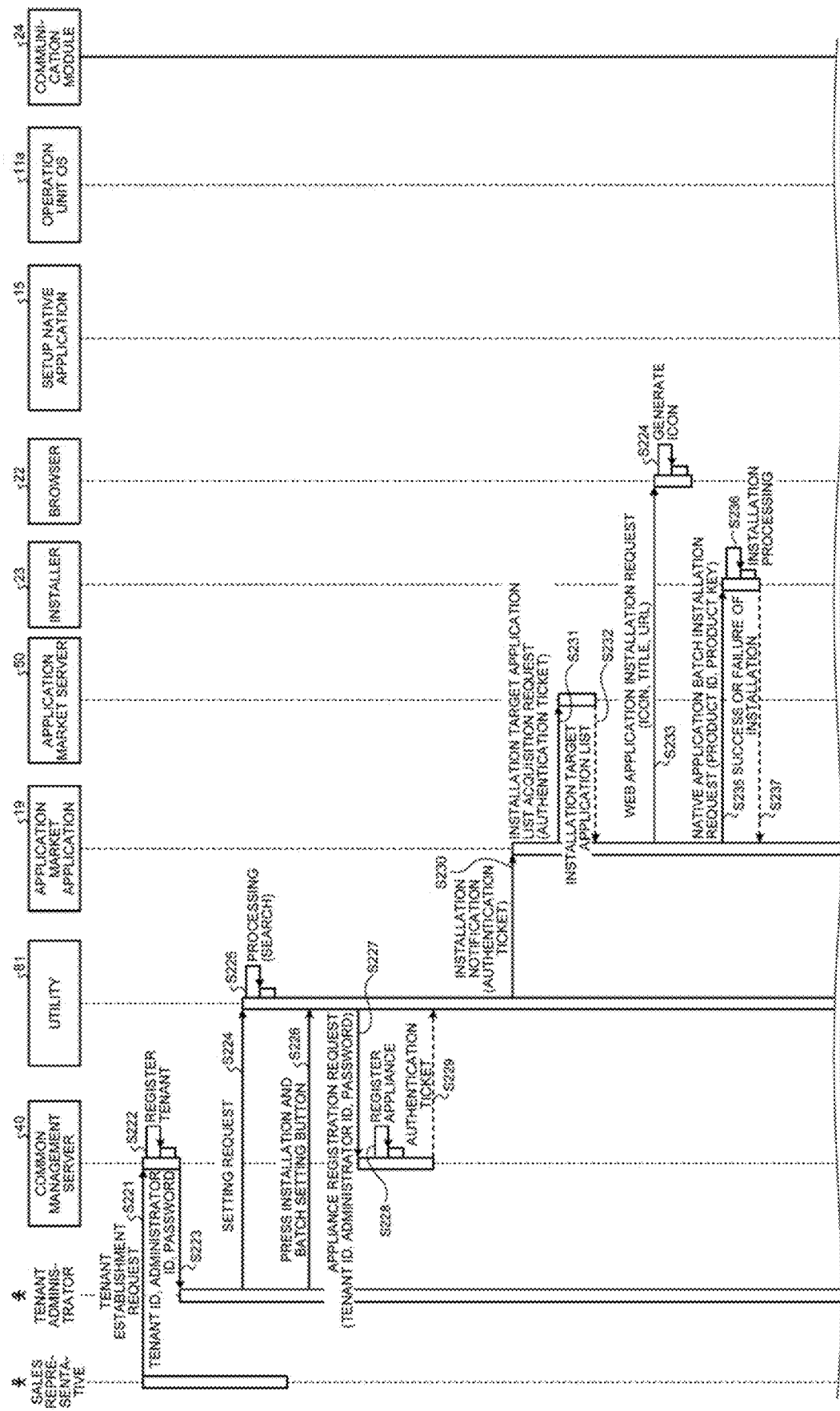
FIG. 17A is a sequence diagram illustrating an example of a procedure of installation and batch setting to be remotely performed in the appliance management system according to the first embodiment.
Figure 17B:
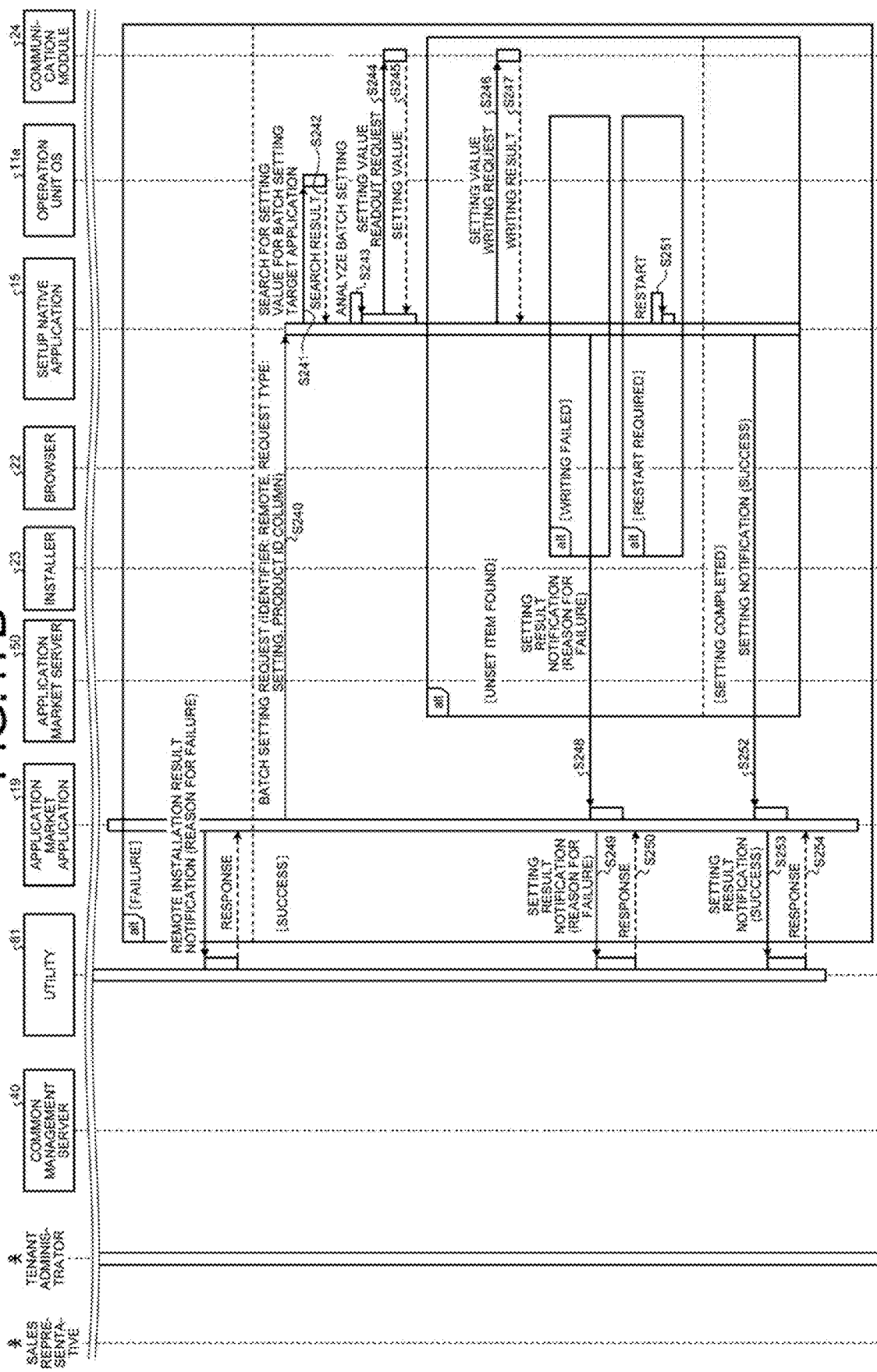
FIG. 17B is a sequence diagram illustrating an example of the procedure of installation and batch setting to be remotely performed in the appliance management system according to the first embodiment.
Figure 18:
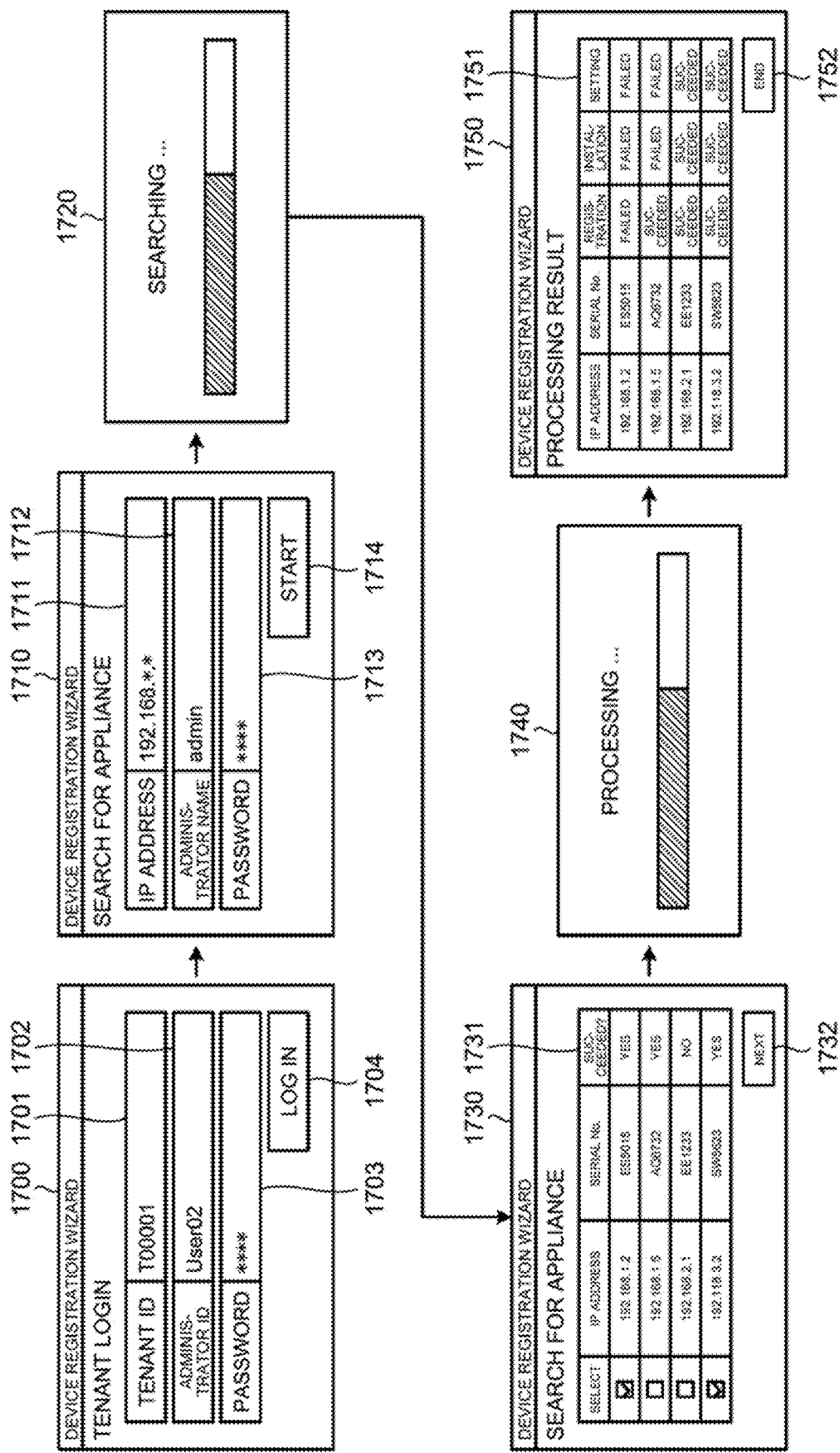
FIG. 18 is a diagram illustrating a flow of screen transition in the installation and batch setting to be remotely performed in the appliance management system according to the first embodiment.

FIG. 17A and FIG. 17B are sequence diagrams illustrating an example of a procedure of installation and batch setting to be remotely performed in the appliance management system according to the first embodiment. FIG. 18 is a diagram illustrating a flow of screen transition in the installation and batch setting to be remotely performed in the appliance management system according to the first embodiment. FIG. 17A and FIG. 17B may be collectively referred to as FIG. 17. With reference to FIG. 17 and FIG. 18, the following describes the procedure of installation and batch setting that is performed for a plurality of the information processing devices (MFP 10) remotely, that is, by the PC 80 in the appliance management system 1 according to the present embodiment.

Steps S221 to S223

The pieces of processing at Steps S221 to S223 are the same as the respective pieces of processing at Steps S111 to S113 illustrated in FIG. 13.

Steps S224 and S225

In accordance with an operation input to the keyboard 961 and the mouse 962 of the PC 80 performed by the tenant administrator, the display controller 805 of the utility 81 causes the display 958 to display a tenant login screen 1700 illustrated in FIG. 18.

The tenant login screen 1700 is a screen for logging in the PC 80 using the tenant ID, the tenant administrator ID, and the password notified from the common management server 40. As illustrated in FIG. 18, the tenant login screen 1700 includes a tenant ID input box 1701 for inputting the tenant ID, a tenant administrator ID input box 1702 for inputting the tenant administrator ID, a password input box 1703 for inputting the password, and a login button 1704 for executing a login.

The tenant administrator inputs the tenant ID, the tenant administrator ID, and the password respectively to the tenant ID input box 1701, the tenant administrator ID input box 1702, and the password input box 1703 on the tenant login screen 1700 via the keyboard 961 and the mouse 962. The tenant administrator then presses the login button 1704.

The display controller 805 of the utility 81 then causes the display 958 to display an appliance search screen 1710 illustrated in FIG. 18.

The appliance search screen 1710 is a screen for searching for the information processing device (appliance) to be a subject of installation of the introduction application and batch setting of the setting values for the introduction application. The appliance search screen 1710 includes an IP address input box 1711 for inputting the IP address (or an IP address range) of the information processing device as a search target, a tenant administrator name input box 1712 for inputting the tenant administrator name, a password input box 1713 for inputting the password, and a start button 1714 for executing search of the information processing device (appliance).

The tenant administrator inputs the IP address (or the IP address range), the tenant administrator name, and the password of the search target respectively to the IP address input box 1711, the tenant administrator name input box 1712, and the password input box 1713 on the appliance search screen 1710 via the keyboard 961 and the mouse 962. The tenant administrator then presses the start button 1714 to search for the information processing device (appliance) as a target.

The display controller 805 of the utility 81 then causes the display 958 to display a searching display dialog box 1720 illustrated in FIG. 18 indicating that search is being performed. The searching display dialog box 1720 is a dialog box indicating a degree of progress of search processing with a progress bar to indicate that search is being executed. The target appliance searcher 802 of the utility 81 then searches for the information processing device (appliance) included in the IP address range of the search target input to the password input box 1713. The appliance information acquirer 803 of the utility 81 then acquires the appliance information including the serial number from the information processing device as the target appliance of installation of the application and the batch setting of the setting values found by the target appliance searcher 802.

After completion of the search by the target appliance searcher 802, as illustrated in FIG. 18, the display controller 805 causes the display 958 to display a found appliance display screen 1730 indicating a list of the information processing devices (appliances) found by the target appliance searcher 802. The searched appliance display screen 1730 includes a searched appliance list display region 1731 indicating the list of the searched information processing devices (appliances), and a next button 1732 (installation and batch setting button) for executing installation of the introduction application and the batch setting of the setting values.

The searched appliance list display region 1731 is a display region indicating a list of information including the IP address, the serial number (serial No.) of the information processing device, and information representing success or failure, that is, indicating whether installation can be performed, as the appliance information acquired by the appliance information acquirer 803. The success or failure information representing "No" signifies, for example, that installation is unfeasible since the information processing device is executing a job.

Step S226

The tenant administrator then selects the information processing device as the target of appliance registration, installation of the introduction application, and the batch setting of the setting values from among the information processing devices indicated as a list by the searched appliance list display region 1731 by checking a checkbox. Herein, described is an example of selecting the MFP 10 as the information processing device as the target. A plurality of information processing devices can be selected with the checkbox. The tenant administrator then presses the "next" button 1732 to execute appliance registration, installation of the introduction application, and the batch setting of the setting values. The display controller 805 of the utility 81 then causes the display 958 to display a processing display dialog box 1740 illustrated in FIG. 18 to indicate that processing is being performed. The processing display dialog box 1740 is a dialog box indicating a degree of progress of the processing with a progress bar to indicate that appliance registration, installation of the introduction application, and the batch setting of the setting values are being performed.

Step S227

The appliance registration requester 804 of the utility 81 transmits the appliance registration request including the tenant ID, the tenant administrator ID, and the password input on the tenant login screen 1700 to the common management server 40 together with the appliance information acquired by the appliance information acquirer 803 via the communicator 801.

Step S228

When receiving the appliance registration request from the PC 80 via the communicator 401, the appliance registration unit 403 of the common management server 40 performs authentication using the administrator ID and the password included in the appliance registration request. In a case in which authentication is normally performed, the appliance registration unit 403 searches tenant IDs registered by the tenant registration unit 402 for a tenant ID matching the tenant ID for identifying the tenant included in the appliance registration request, and associates the found tenant ID with the information (serial number) for identifying the MFP 10 as the appliance information to perform appliance registration. The appliance registration unit 403 causes the storage 405 to store the information associating the tenant ID with the serial number.

Step S229

The appliance registration unit 403 then transmits the authentication ticket issued by the authentication described above to the PC 80 via the communicator 401.

Step S230

The utility 81 of the PC 80 then transmits the installation notification including the authentication ticket to the application market application 19.

Steps S231 to S237

The pieces of processing at Steps S231 to S237 are the same as the pieces of processing at Steps S126 to S132 illustrated in FIG. 13.

Steps S238 and S239

When the success or failure of installation received from the installer 113 of the installer 23 indicates failure, the installation controller 112 of the application market application 19 transmits a remote installation result notification including a reason for failure of installation to the utility 81 of the PC 80. When receiving the remote installation result notification, the utility 81 of the PC 80 returns a response for the notification to the application market application 19.

Steps S240 to S245

The pieces of processing at Steps S240 to S245 are the same as the respective pieces of processing at Steps S135 to S140 illustrated in FIG. 13. However, at Step S240, it is assumed that the batch setting request transmitted to the setting controller 105 by the installation controller 112 has the identifier of "remote" and the request type of "setting", and includes the column of the product ID of the introduction application.

Steps S246 and S247

With an unset item found in the setting values read by the set value reader 108, the setting value writer 109 of the setting controller 105 of the setup native application 15 transmits the setting value writing request for writing the setting data acquired by the setting value list acquirer 107 as the setting value for the introduction application to the main unit 12 together with the setting data via the communication module 24. When receiving the setting value writing request, the main unit 12 writes the setting value corresponding to the unset item in the setting data into the storage 914 to be updated. The main unit 12 then transmits a writing result of the setting value to the setting value writer 109 via the communication module 24.

Step S248

When the writing result transmitted from the main unit 12 indicates failure, the setting value writer 109 of the setup native application 15 transmits a setting result notification including a reason for failure of writing to the application market application 19 of the MFP 10.

Steps S249 and S250

When receiving the setting result notification from the setting value writer 109 of the setup native application 15, the application market application 19 of the MFP 10 transmits the setting result notification to the utility 81 of the PC 80. When receiving the setting result notification, the utility 81 of the PC 80 returns a response for the notification to the application market application 19.

Step S251

If there is a setting value requiring a restart among the setting values written in the main unit 12, the setting controller 105 of the setup native application 15 restarts the MFP 10.

Step S252

With no unset item found in the setting values read by the set value reader 108, the setting value writer 109 of the setup native application 15 transmits a setting notification indicating that setting is successively performed to the application market application 19 of the MFP 10.

Steps S253 and S254

When receiving the setting notification from the setting value writer 109 of the setup native application 15, the application market application 19 of the MFP 10 transmits the setting notification to the utility 81 of the PC 80. When receiving the setting notification, the utility 81 of the PC 80 returns a response for the setting notification to the application market application 19. The display controller 805 of the utility 81 then causes the display 958 to display a processing result display screen 1750 displaying results of appliance registration, installation of the introduction application, and the batch setting of the setting values regarding the information processing device that is selected as the target of the processing on the searched appliance display screen 1730.

The processing result display screen 1750 includes a processing result list display region 1751 and an end button 1752. The processing result list display region 1751 is a display region for displaying, as a list, results of appliance registration, installation of the introduction application, and the batch setting of the setting values regarding each information processing device. The tenant administrator presses the end button 1752 to end the processing.

Through the procedures at Steps S221 to S254 described above, the information processing device that is found from a plurality of the information processing devices (MFP 10) remotely, that is, by the PC 80, can be registered in the cloud (common management server 40) by appliance registration, the introduction application can be automatically installed, and the setting values for the introduction application can be set by batch. Due to this, the cloud service using the common management server 40 can be easily associated with the information processing device (appliance) such as the MFP 10, and time and effort for preparation for receiving provision of the cloud service can be reduced. Additionally, a plurality of the information processing devices as the target of processing are searched for, and appliance registration, installation of the introduction application, and the batch setting of the setting values can be performed for all of the searched information processing devices, so that time and effort for preparation for receiving provision of the cloud service can be further reduced.

The appliance management system 1 according to the present embodiment may have all of the functions of performing the installation and batch setting when the setup application is not installed illustrated in FIG. 6, the installation and batch setting when the setup application is installed illustrated in FIG. 13 and FIG. 16, and the installation and batch setting to be remotely performed illustrated in FIG. 17, or may have a function of performing at least one of the pieces of processing described above.

Second Embodiment

In the first embodiment described above, described is an operation of automatically searching for the licensed application, and setting the setting values for the application. The present embodiment mainly describes an operation of acquiring license information representing a status of a license for a contracted application, and selecting an application to which the license has not been assigned to assign the license to the application by the user (administrator) in detail. In the appliance management system 1 according to the present embodiment, the entire configuration, the hardware configuration of the MFP and each server, the software configuration, and the configuration of the functional block are the same as those in the first embodiment. However, an application obtained by combining the setup Web application 14 with the setup native application 15 illustrated in FIG. 4 is referred to as a "setup application 15a" in the present embodiment.

Installation and Batch Setting

Figure 19A:
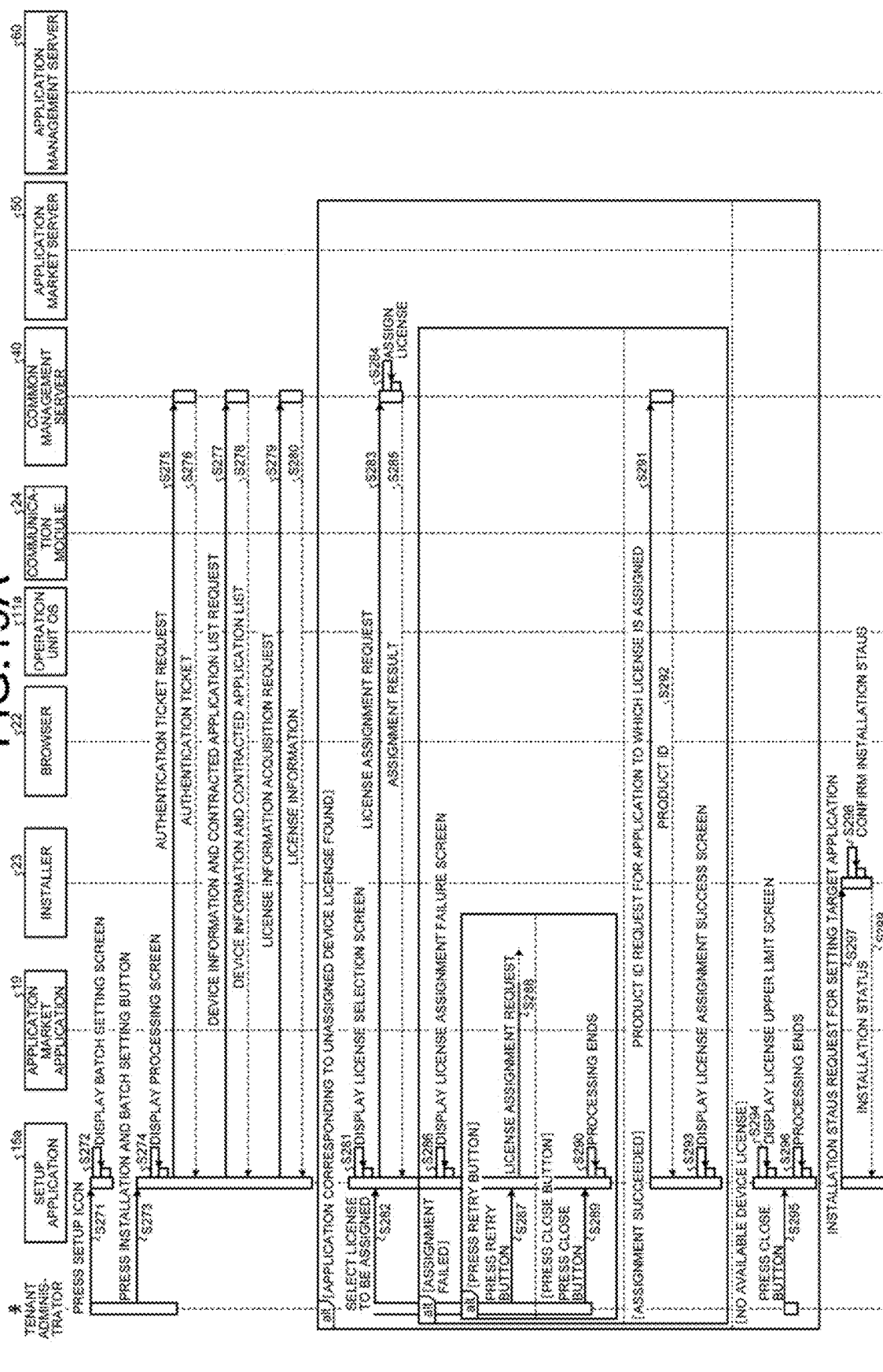
FIG. 19A is a sequence diagram illustrating an example of a procedure of installation and batch setting in an appliance management system according to a second embodiment.
Figure 19B:
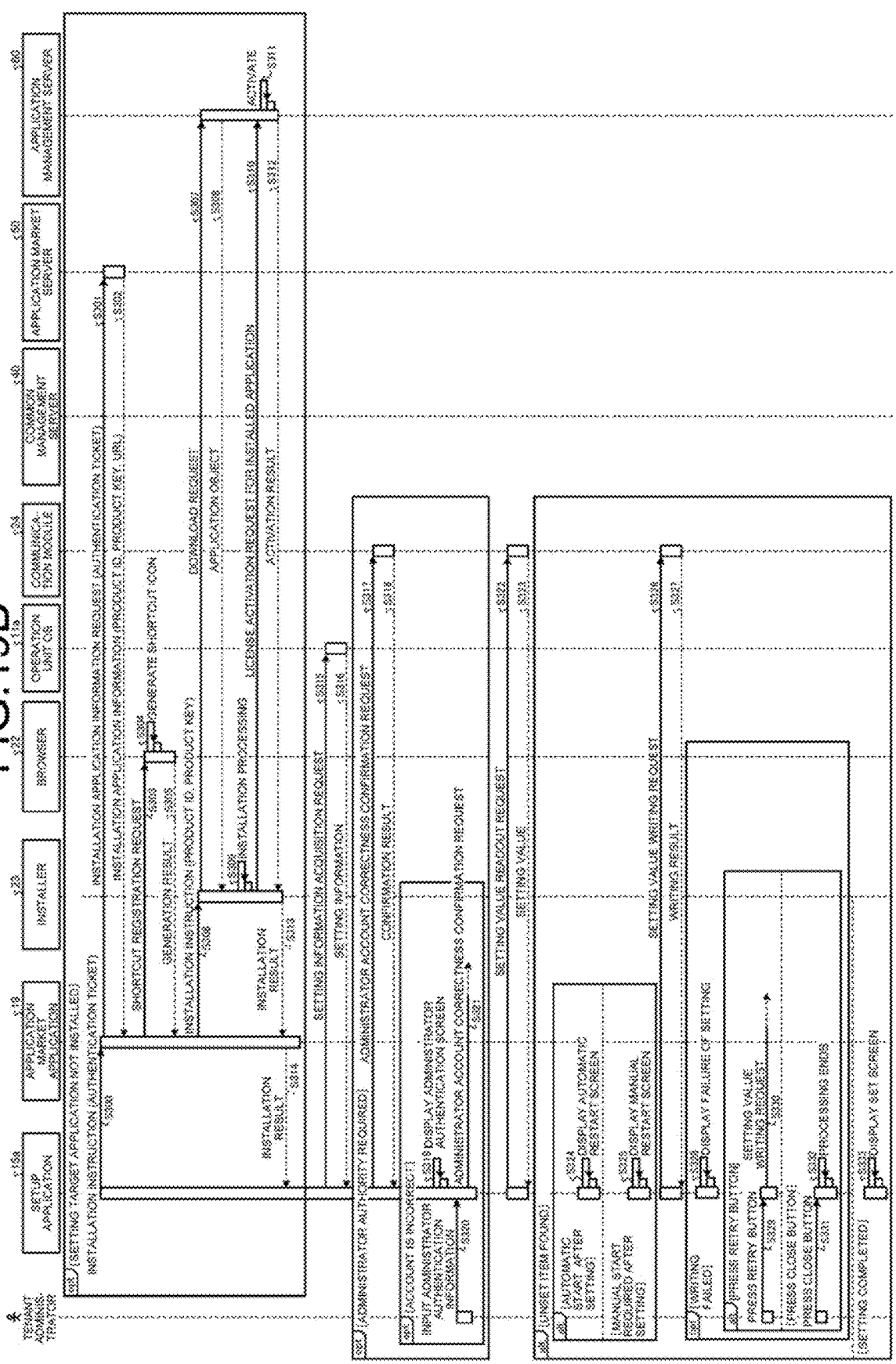
FIG. 19B is a sequence diagram illustrating an example of the procedure of installation and batch setting in the appliance management system according to the second embodiment.
Figure 20:
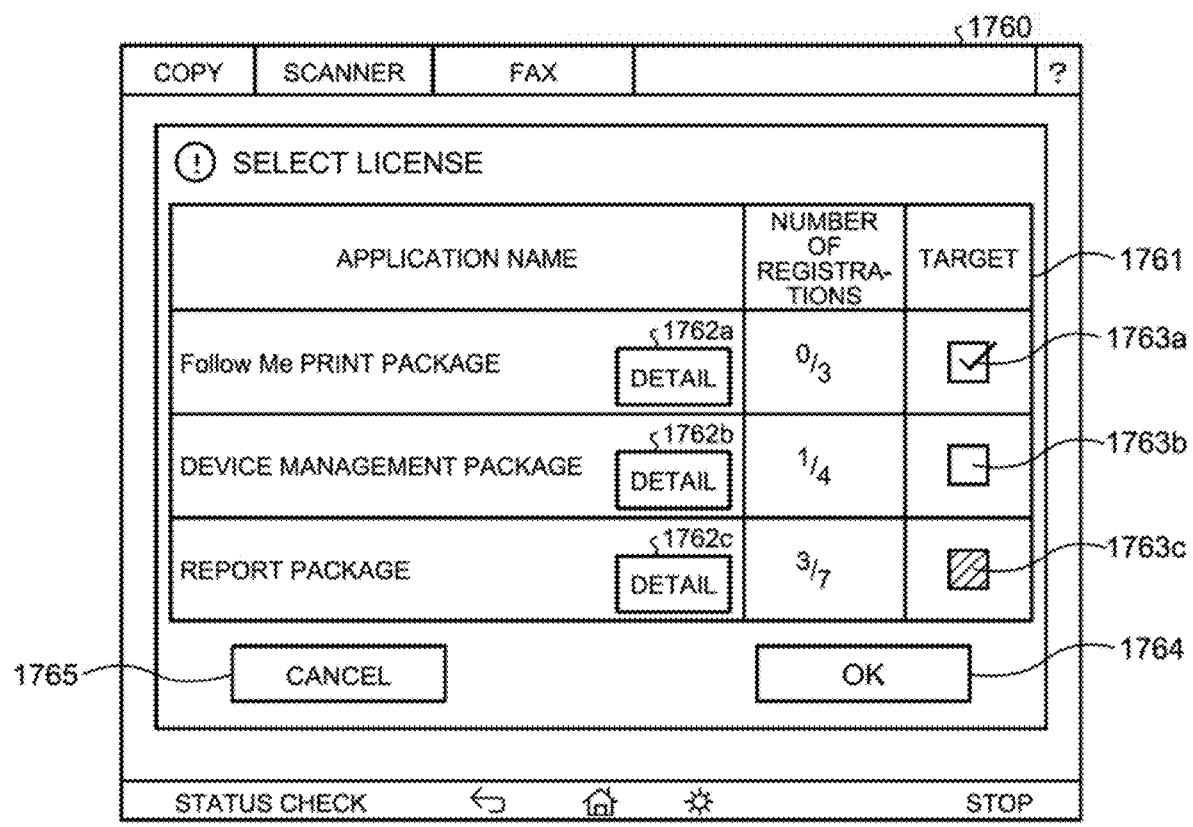
FIG. 20 is a diagram illustrating an example of a license selection screen.
Figure 21:
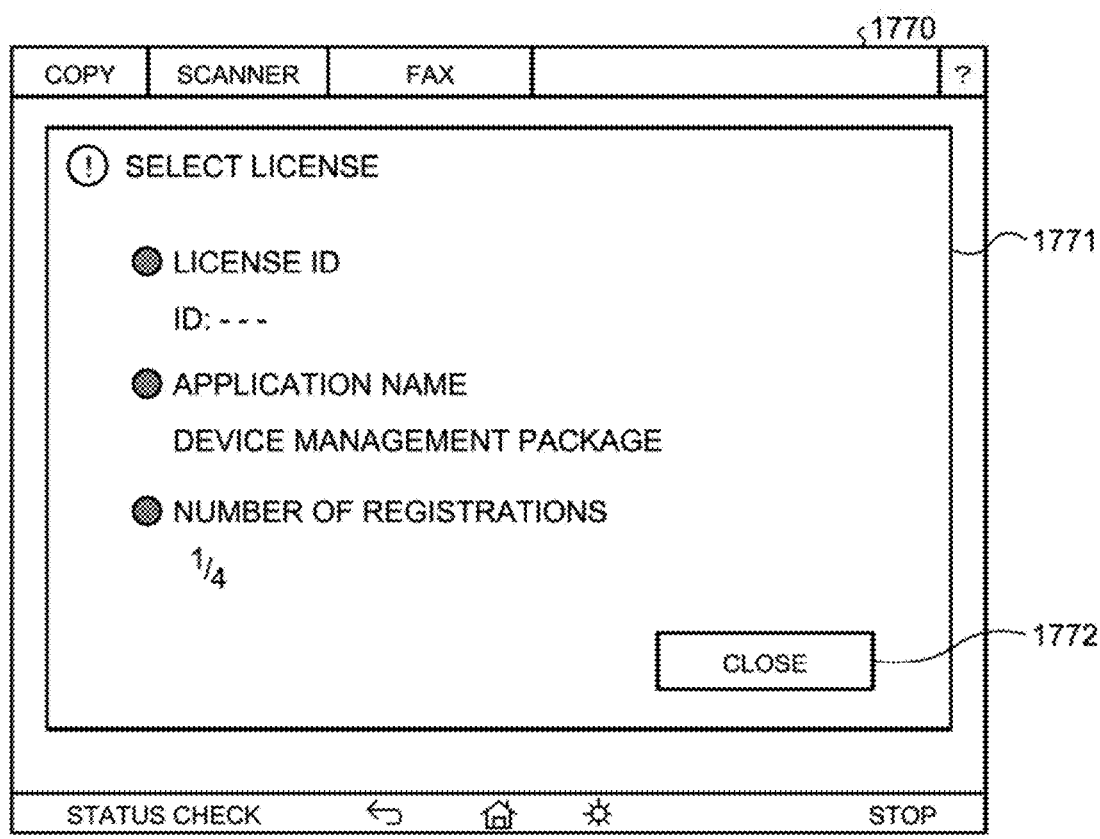
FIG. 21 is a diagram illustrating an example of a license information detail screen.

FIG. 19A and FIG. 19B are sequence diagrams illustrating an example of a procedure of installation and batch setting in the appliance management system according to the second embodiment. FIG. 20 is a diagram illustrating an example of a license selection screen. FIG. 21 is a diagram illustrating an example of a license information detail screen. FIG. 19A and FIG. 19B may be collectively referred to as FIG. 19. With reference to FIG. 19 to FIG. 21, the following describes the procedure of installation and batch setting in the appliance management system 1 according to the present embodiment. It is assumed that tenant registration (Step S112) and appliance registration (Step S121) illustrated in FIG. 13 have been already performed before the installation and batch setting illustrated in FIG. 19.

Steps S271 and S272

When the tenant administrator performs a touch operation on the setup icon 1002 on the home screen 1000 illustrated in FIG. 8 described above, the display controller 115 of the setup application 15a causes the operation panel 905 to display the batch setting screen 1600 illustrated in FIG. 14 described above. Alternatively, it may be assumed that an authentication operation is performed on the tenant login screen 1500 as described above at Steps S115 and S116 of FIG. 13 before the batch setting screen 1600 is displayed.

Steps S273 and S274

When the tenant administrator performs a touch operation on the batch setting button 1601 (installation and batch setting button) via the operation panel 905, the display controller 115 causes the operation panel 905 to display the installing dialog box 1630 illustrated in FIG. 14 described above.

Steps S275 and S276

The installation controller 112 of the setup application 15a then transmits an authentication ticket request (including the identification information of the appliance or the user) for making a request for the authentication ticket to the common management server 40 via the communicator 101. When receiving the authentication ticket request, the common management server 40 issues the authentication ticket, and transmits the authentication ticket to the MFP 10.

Steps S277 and S278

Next, the installation controller 112 of the setup application 15a transmits a request for a list of the information associated with the MFP 10 (the appliance information, and the tenant information of the tenant to which the MFP 10 belongs) and the identification information of an available contracted application or package of an application (hereinafter, simply referred to as an application in some cases) to the common management server 40 via the communicator 101 using the acquired authentication ticket. The application or the package of the application may be called a service in some cases. The identification information may be identification information in units of a service for which a purchase contract is made such as a package ID and an application ID. When receiving the request, the common management server 40 transmits, to the MFP 10, a list of the appliance information, the tenant information associated with the appliance information, and the identification information of the contracted application available for the MFP 10. At the time of making the request for the list of the identification information, by transmitting a model name or an appliance type of the information processing device such as the MFP 10 (multifunction peripheral) and an electronic blackboard device, and other appliance information at the same time, and extracting only a contracted application that can be appropriately introduced into such a type of appliance or an appliance having such a model name, or an erroneous operation of the appliance due to erroneous selection on the license selection screen or erroneous introduction may be prevented (described later).

Steps S279 and S280

The license checker 110 of the setup application 15a then transmits, to the common management server 40 via the communicator 101, a license information acquisition request for making a request for the license information representing the status of the license for the available contracted application received from the common management server 40 using the acquired identification information of the application. When receiving the license information acquisition request, the common management server 40 checks the status of the license for the contracted application available for the MFP 10, and transmits the license information including the status of the license to the MFP 10. Herein, the license information is information about a device license among licenses, and includes, for example, a total number of device licenses corresponding to each contracted application, the number of the device licenses assigned to the device, information of the device to which the device license is assigned. The licenses include a user license that is assigned to each user of the tenant in addition to the device license described above that is assigned to the device.

If the license information received by the MFP 10 indicates that there is a contracted application not assigned with the device license, the process proceeds to Step S281. Meanwhile, the license information received by the MFP 10 indicates no contracted application to which the device license is assigned, the process proceeds to Step S294.

Step S281

When the license information received by the MFP 10 indicates that there is a contracted application not assigned with the device license, the display controller 115 of the setup application 15a causes the operation panel 905 to display a license selection screen 1760 illustrated in FIG. 20, for example. With no contracted application not assigned with the device license found, the license selection screen 1760 may be displayed to indicate that there is no application to which the device license can be assigned.

As illustrated in FIG. 20, the license selection screen 1760 is a screen indicating an assignment status of the device license for the contracted application in accordance with the license information received by the MFP 10, and enabling the selection of assignment to the application to which the device license is not assigned. The license selection screen 1760 includes an application list display region 1761, detail buttons 1762a to 1762c, assignment selection checkboxes 1763a to 1763c, an OK button 1764, and a cancel button 1765.

The application list display region 1761 is a region for displaying the information of the contracted application as a list, and includes spaces of an "application name" for displaying a name of the application, a "number of registrations" indicating the assignment status of the device license for the application, and a "target" for selecting assignment of the device license to the application. Alternatively, a use start date on which the application becomes available, a contract date, a purchase date, contractor information (a tenant administrator name, a user name, a department), and information of a distributor (a manufacturer, a dealer, and a provider) for each contracted application may be optionally combined for display. Contracted applications the use start date of which is later than the listed date and the license information thereof may also be displayed as a list, and the device license may be enabled to be assigned thereto (execution of the application is disabled since the use start date has not come). Use start dates of all the contracted applications may be displayed in order from the oldest date together with the applications the use start date of which is later than the listed date. Accordingly, the device (information processing device) is enabled to easily check the device license status of the tenant to which the device belongs and select the application to be set.

The "application name" column in the example of FIG. 21 displays respective applications of "FollowMe print package", "device management package", and "report package". Buttons (the detail buttons 1762a to 1762c) for displaying detail information of the device license of the application are set on the side of the names of the respective applications displayed in "application name" of the application list display region 1761. For example, when the tenant administrator presses the detail button 1762*b*, the display controller 115 causes the operation panel 905 to display a license information detail screen 1770 for displaying detail information of the device license for the application of "device management package" as illustrated in FIG. 21. As illustrated in FIG. 21, the license information detail screen 1770 includes a license information detail display region 1771 and a close button 1772. The license information detail display region 1771 is a region for displaying, for example, an ID of the device license contracted for the application of "device management package", the name of the application, and the number of registrations indicating the assignment status of the device license. In the license information detail display region 1771, for example, other information such as a use start time of the application, a status of contract, and a name of a charge plan may be displayed, not limited to the display content described above. The close button 1772 is a button for closing the license information detail screen 1770.

In the space of "number of registrations", for example, as illustrated in FIG. 20, displayed is a numeral including the number of device licenses contracted for the respective applications as a denominator, and the number of licenses thereamong that have been already assigned to the devices (MFP) as a numerator. For example, in a case of the application of "device management package", "1/4" is displayed in the space of "number of registrations", so that it is indicated that the number of device licenses contracted for the application is 4, and one of the device licenses has been already assigned to the device.

In the space of "target", disposed is a checkbox (assignment selection checkboxes 1763*a* to 1763*c*) for selecting assignment of the device license to a corresponding application. If there is the device license that is not assigned to a specific application (that is, no available device license), and devices to which the device license has been already assigned do not include the MFP 10, check or uncheck of the checkbox (the assignment selection checkboxes 1763*a* and 1763*b* in FIG. 20) can be selected. When all of the device licenses are assigned to the devices for a specific application (that is, no available device license), or the devices to which the device license has been already assigned include the MFP 10, check or uncheck of the checkbox (the assignment selection checkbox 1763*c* in FIG. 20) cannot be selected (for example, the checkbox is placed in a gray-out state as illustrated in FIG. 20). Additionally, a usage starting date, a contract date, a purchase date, contractor information (a tenant administrator name, a user name, a department), or information of a distributor (a manufacturer, a dealer, and a provider) may be displayed on the license information detail screen 1770.

The OK button 1764 is a button for assigning the device license to the applications the assignment selection checkboxes 1763*a* to 1763*c* of which are checked. The cancel button 1765 is a button for canceling assignment processing of the device license. The license selection screen 1760 and the license information detail screen 1770 may be displayed at the time of setting cancellation (uninstallation) in addition to the time of batch setting to make a license assignment canceling request for the selected contracted application to the common management server for only the information processing device the screen of which is displayed. For example, at the time of setting cancellation illustrated in FIG. 12, during a period after the batch setting cancellation button is pressed at Step S84 or after administrator authentication is performed at Step S92 until writing of the setting value is executed at Step S95, the license selection screen and the license information detail screen may be displayed, and a setting at the time of setting cancellation and license assignment cancellation may be executed by referring to the setting value for only the selected application.

Steps S282 to S285

When the tenant administrator selects the application to which the device license is assigned from among the contracted applications displayed on the license selection screen 1760, and performs a touch operation on the OK button 1764, the license checker 110 of the setup application 15*a* transmits, to the common management server 40, a license assignment request for making a request to assign the device license to the selected application via the communicator 101. When receiving the license assignment request, the common management server 40 assigns the device license to the application as a target in accordance with the license assignment request, and transmits an assignment result to the MFP 10.

When the assignment result transmitted from the common management server 40 indicates failure, the process proceeds to Step S286, and when the assignment result indicates success, the process proceeds to Step S291.

Step S286

When the assignment result transmitted from the common management server 40 indicates failure, the display controller 115 causes the operation panel 905 to display a screen indicating that assignment of the device license failed. The screen includes display of the fact that assignment of the device license failed, a retry button for executing assignment of the device license again, and a close button for abandoning assignment and closing the screen.

Steps S287 and S288

In response to the tenant administrator's touching the retry button, the license checker 110 of the setup application 15*a* transmits the license assignment request for the application the assignment for which failed to the common management server 40 via the communicator 101 again. The subsequent operations are the same as those at Steps S284 and S285 described above.

Steps S289 and S290

In response to the tenant administrator's touching the close button, the setup application 15*a* ends the processing.

Steps S291 and S292

When the assignment result transmitted from the common management server 40 at Step S285 indicates success, the installation controller 112 of the setup application 15*a* transmits a product ID request for making a request for the product ID of the application to which the device license is assigned (or one or more applications included in the package of the application) to the common management server 40 via the communicator 101. When receiving the product ID request, the common management server 40 transmits, to the MFP 10, the product ID of the application to which the device license is assigned indicated by the product ID request.

Step S293

When the communicator 101 of the MFP 10 receives the product ID, the display controller 115 causes the operation panel 905 to display a screen indicating that assignment of the device license succeeded.

Step S294

When the license information received by the MFP 10 at Step S280 indicates no contracted application to which the device license is assigned, the display controller 115 of the setup application 15*a* causes the operation panel 905 to display a license upper limit screen depicting that there is no contracted application to which the device license is assigned is not present, that is, no available device license.

Steps S295 and S296

In response to the tenant administrator's touching the close button on the license upper limit screen, the setup application 15a ends the processing.

Steps S297 to S299

When the device license is assigned to the contracted application, the installation controller 112 of the setup application 15a transmits, to the installer 23, an installation status request to check the installation status of the contracted application to which the device license is assigned (hereinafter, referred to as a setting target application in some cases). When receiving the installation status request, the installer 113 of the installer 23 checks whether the setting target application has been already installed, and transmits the installation status including the check result to the setup application 15a. The application to be installed may include an application for which a user license is contracted. That is, the setting target application described above may include an application for which a user license is contracted in addition to the application to which the device license is assigned. In this case, it doesn't matter, to the application for which the user license is contracted, whether the user license is assigned to a specific user (for example, the tenant administrator logging in the MFP 10). Thus, the application for which the user license is contracted is not a target of processing for checking the license status and assigning the license as described above at Steps S279 to S296. A list of applications for which the user license is contracted may be displayed on the license selection screen 1760 displayed at Step S281 in addition to the applications for which the device license is contracted, but the applications are not selected as a target to which the license (user license) is assigned. When a specific user starts the application with the contracted user license, it is checked whether the user license is assigned to the specific user at the starting time, and the application cannot be used if the user license is not assigned to the specific user at this point.

Step S300

When the installation status received from the installer 113 indicates that the setting target application is not installed, the installation controller 112 of the setup application 15a transmits an installation instruction for making a request for installation of the setting target application to the application market application 19 together with the authentication ticket acquired at Step S276 described above.

Steps S301 and S302

When receiving the installation instruction and the authentication ticket, the installation target application list acquirer 111 of the application market application 19 transmits an installation application information request for making a request for information of the setting target application to the application market server 50 together with the authentication ticket via the communicator 101. When the communicator 501 receives the installation application information request and the authentication ticket, the application information transmitter 502 of the application market server 50 acquires, from the storage 503, the product ID and the product key of the native application and the URL of the Web application among the setting target applications using the authentication ticket. The application information transmitter 502 then transmits installation application information including the above information to the MFP 10 via the communicator 501.

Step S303

The installation controller 112 of the application market application 19 transmits, to the browser 22, a shortcut registration request for making a request to generate a shortcut using the URL of the Web application among the setting target applications included in the installation application information received by the communicator 101.

Steps S304 and S305

When receiving the shortcut registration request, the icon generator 114 of the browser 22 generates a shortcut icon for designating a path including an execution file of the Web application in accordance with the URL of the Web application included in the shortcut registration request. The icon generator 114 then transmits a generation result of the shortcut icon to the application market application 19.

Step S306

The installation controller 112 of the application market application 19 transmits, to the installer 23, an installation instruction including the product ID and the product key of the native application among the setting target applications included in the installation application information received by the communicator 101.

Steps S307 and S308

When receiving the installation instruction, the installer 113 of the installer 23 transmits a download request for an entity file (application object) of the setting target application (native application) indicated by the product ID and the product key to the application management server 60 via the communicator 101. When receiving the download request, the application management server 60 transmits, to the MFP 10, the entity file (application object) of the setting target application (native application) indicated by the download request.

Step S309

The installer 113 of the installer 23 installs the native application using the entity file (application object) of the setting target application (native application) received by the communicator 101.

Steps S310 to S312

The installer 113 of the installer 23 transmits a license activation request for making a request to activate the device license for the installed setting target application to the application management server 60 via the communicator 101. When receiving the license activation request, the application management server 60 activates the device license for the installed setting target application. Herein, activation indicates that the fact that the device license is assigned to the application is registered to be managed. The application management server 60 then transmits an activation result to the MFP 10.

Steps S313 and S314

When the communicator 101 receives the activation result, the installer 113 of the installer 23 transmits an installation result of the setting target application to the application market application 19. The installation controller 112 of the application market application 19 then transmits the installation result received from the installer 23 to the setup application 15a.

Steps S315 and S316

When receiving the installation result, the setting value list acquirer 107 of the setting controller 105 of the setup application 15a transmits a setting information acquisition request for making a request to acquire information (setting information) of the setting value for use in the setting target application to the setting target application via the operation unit OS 11a. When receiving the setting information acquisition request, the setting target application transmits the setting information of the required setting value to the setup application 15a via the operation unit OS 11a.

Steps S317 and S318

When the setting information received by the setup application 15a includes a setting value for which administrator authority is required to write (update) the setting value, the setting controller 105 of the setup application 15a transmits an administrator account correctness confirmation request for making a request to confirm correctness of a default administrator account (for example, an ID "admin", without a password) to the main unit 12 via the communication module 24. When receiving the administrator account correctness confirmation request, the main controller 121 of the main unit 12 performs authentication with the administrator account, and transmits a result of the authentication to the setup application 15a as a check result via the communication module 24.

Steps S319 to S321

When the check result transmitted from the main controller 121 indicates that the administrator account is incorrect, the display controller 115 of the setup application 15a causes the operation panel 905 to display an authentication screen similar to the administrator authentication screen 1610 illustrated in FIG. 9 described above. When the tenant administrator inputs information of the administrator account (administrator authentication information) on the authentication screen, the setting controller 105 transmits the administrator account correctness confirmation request to the main unit 12 again via the communication module 24 based on the input administrator account. The subsequent operations are the same as those at Step S318.

Steps S322 and S323

The set value reader 108 of the setting controller 105 of the setup application 15a transmits, to the main unit 12 via the communication module 24, a setting value readout request for making a request to read out setting values that are currently set for the setting values for use in the setting target application. When receiving the setting value readout request, the main controller 121 of the main unit 12 transmits current values of the setting values for use in the setting target application to the setup application 15a via the communication module 24.

With an unset setting value found among the setting values for use in the setting target application, when an automatic restart is required after the setting value is written, the process proceeds to Step S324. With an unset setting value found among the setting values for use in the setting target application, when a manual restart is required after the setting value is written, the process proceeds to Step S325. With an unset setting value found among the setting values for use in the setting target application, when a restart is not required after the setting value is written, the process proceeds to Step S326. If the setting values for use in the setting target application have been already set, the process proceeds to Step S333.

Step S324

The display controller 115 of the setup application 15a causes the operation panel 905 to display, for example, a screen equivalent to the restart warning dialog box 1620 illustrated in FIG. 9 described above, which is a screen for warning that a restart is automatically performed. The tenant administrator checks details of the screen, and operates an OK button on the screen to delete the screen, and advances the process to Step S326.

Step S325

The display controller 115 of the setup application 15a causes the operation panel 905 to display, for example, a screen equivalent to the restart warning dialog box 1620 illustrated in FIG. 9 described above, which is a screen for warning that a manual restart is required. The tenant administrator checks content of the screen, operates the OK button on the screen to delete the screen, and advances the process to Step S326.

Steps S326 and S327

The setting value writer 109 of the setting controller 105 of the setup application 15a transmits a setting value writing request to write the setting value for use in the setting target application to the main unit 12 via the communication module 24. When receiving the setting value writing request, the main unit 12 writes the setting value corresponding to an unset item (an unset setting value) into the storage 914 to be updated. At the time of the writing processing of the setting value, as indicated by the screen for warning at Step S324 or S325, the restart of the MFP 10 is executed as appropriate. The main unit 12 then transmits a writing result of the setting value to the setup application 15a via the communication module 24.

Step S328

In a case in which the writing result of the setting value transmitted from the main unit 12 indicates failure of writing, the display controller 115 of the setup application 15a causes the operation panel 905 to display a screen indicating that the setting failed. The screen includes a retry button for executing writing of the setting value again, and a close button for abandoning the writing processing and closing the screen in addition to display of the fact that the setting failed.

Steps S329 and S330

In response to the tenant administrator's touch operation on the retry button, the setting value writer 109 of the setting controller 105 of the setup application 15a transmits the setting value writing request to write the setting value for use in the setting target application again to the main unit 12 via the communication module 24. The subsequent operations are the same as those at Step S327.

Steps S331 and S332

In response to the tenant administrator's touch operation on the close button, the setup application 15a ends the processing.

Step S333

When the setting values for use in the setting target application have been already set at Step S323, the display controller 115 of the setup application 15a causes the operation panel 905 to display a setting completed screen indicating that the setting values for use in the setting target application have been already set.

Through the procedures at Steps S271 to S333 described above, the contracted application (including a package) that can be installed in the device (one or more information processing devices such as the MFP 10) to which the device license is not assigned is enabled to be selected, and it is enabled to assign the device license to the selected application, automatically perform installation, and set the setting values for use in the application by batch. Due to this, it is possible to reduce time and effort for preparation for receiving provision of the cloud service using the common management server 40 by each information processing device.

The operations in the second embodiment described above (specifically, pieces of processing for acquiring the license information and assigning the license) can also be applied to the operations in the first embodiment described above (specifically, pieces of processing illustrated in FIG. 6, FIG. 13A, FIG. 13B, FIG. 16A, FIG. 16B, and FIG. 17).

Each of the functions in the respective embodiments can be implemented by one or two or more processing circuits. Herein, the term "processing circuit" includes a processor programmed to execute the functions by software such as a processor implemented by an electronic circuit, and devices designed to execute the above functions such as an application specific integrated circuit (ASIC), a digital signal processor (DSP), a field-programmable gate array (FPGA), a System on a Chip (SoC), a Graphics Processing Unit (GPU), and a conventional circuit module.

At least one of the functional units of the MFP 10, the device management server 20, the common management server 40, the application market server 50, and the PC 80 may be implemented by execution of a computer program in the respective embodiments described above. In such a case the computer program is incorporated and provided in a ROM. The computer program executed by the MFP 10, the device management server 20, the common management server 40, the application market server 50, and the PC 80 according to the respective embodiments may be recorded and provided in an installable or executable file format on a computer-readable recording medium such as a compact disc read only memory (CD-ROM), a flexible disk (FD), a compact disc-recordable (CD-R), a digital versatile disc (DVD), or a Secure Digital (SD) card. The computer program executed by the MFP 10, the device management server 20, the common management server 40, the application market server 50, and the PC 80 according to the respective embodiments may be stored in a computer connected to a network such as the Internet and provided by being downloaded via the network. Furthermore, the computer program executed by the MFP 10, the device management server 20, the common management server 40, the application market server 50, and the PC 80 according to the respective embodiments may be provided or distributed via a network such as the Internet. The computer program executed by the MFP 10, the device management server 20, the common management server 40, the application market server 50, and the PC 80 according to the respective embodiments has a module configuration including at least one of the functional units. A CPU serves as actual hardware and reads the computer program from the storage device to thereby load and generate each of the functional units into a main storage device.

According to the present invention, it is made easier to associate a cloud service with an appliance, which can reduce time and effort for preparation for receiving the cloud service.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing device to be a subject of appliance registration in one or more servers, the information processing device comprising:
   circuitry configured to
      acquire identification information for identifying the information processing device;
      transmit an appliance registration request to the one or more servers, the appliance registration request being for the appliance registration in the one or more servers to associate the identification information acquired with tenant information for identifying a tenant;
      receive a setting request from a device for installing an application and writing a setting;
      install the application in the information processing device based on the setting request;
      determine whether the installed application is a native application or a Web application based on the setting request upon the installing of the application;
      acquire a setting value for the native application from a setting file of object data of the native application in a case of the installed application determined as being the native application among a plurality of applications;
      acquire a setting value for the Web application from the one or more servers providing the function of the Web application via a network in a case of the installed application determined as being the Web application among the plurality of applications; and
      write, to a storage, the setting value for the application acquired.

2. The information processing device according to claim 1, wherein the circuitry is configured to search for the application for which the setting value is to be set.

3. The information processing device according to claim 1, wherein the circuitry is configured to
   acquire license information representing a status of license assignment to the application; and
   display the license information on the application, wherein
   the circuitry acquires the setting value to be set to one of applications selected by an operation in response to an input.

4. The information processing device according to claim 3, wherein the license information is information for certifying a subscription or a contract for the application by the tenant, and includes information representing a number of appliances and a number of users that can use the contracted application.

5. The information processing device according to claim 1, wherein
   the application to be installed in the information processing device serves to transmit information of the information processing device to the one or more servers to store the information in a storage region corresponding to the tenant information, and transmission of the information of the application is executable by writing of the setting value.

6. The information processing device according to claim 1, wherein the application to be installed in the information processing device is a contracted application associated with the tenant information.

7. The information processing device according to claim 1, wherein the circuitry is configured to acquire a list of applications to be installed at the time of the appliance registration, and configured to control installation processing to the applications indicated by the list that was acquired, after the appliance registration.

8. The information processing device according to claim 7, wherein the circuitry is configured to install, in response to the applications indicated by the list including the native application, the native application in accordance with a request.

9. The information processing device according to claim 7, wherein the circuitry is configured to generate, in response to the applications indicated by the list including the Web application, a shortcut icon in accordance with a request, the shortcut icon serving to designate a path including an execution file of the Web application.

10. The information processing device according to claim 7, wherein after the application indicated by the list is installed, writing, to the storage, the setting value for the application.

11. The information processing device according to claim 7, wherein the circuitry is configured to control uninstallation processing to the installed application at the time of the appliance registration, in response to an input operation, and after the uninstallation processing, cancel setting by writing, to the storage, a previous setting value for the application installed at the time of the appliance registration, the previous setting value being set before the setting value acquired is written.

12. The information processing device according to claim 1, wherein the circuitry is configured to perform authentication according to authentication information input via an input unit before the setting value is written, wherein in response to a success of the authentication, the setting value for the application is written to the storage.

13. The information processing device according to claim 1, wherein the circuitry is configured to determine whether the application to be installed at the time of the appliance registration is a licensed application, wherein a setting value for the licensed application determined among the applications is written to the storage.

14. The information processing device according to claim 1, wherein the circuitry is configured to display, before the setting value is written, a warning that the information processing device is to restart due to the setting value.

15. The information processing device according to claim 1, wherein in response to an input operation, the circuitry cancels setting by writing, to the storage, a previous setting value, before the setting value acquired, for the application installed at the time of the appliance registration.

16. The information processing device according to claim 1, wherein the native application is an application that is used by being installed in the information processing device, and the Web application is an application executed on the one or more servers.

17. The information processing device according to claim 1, wherein installation of the Web application includes registering server connection information or registering an icon.

18. An information processing method to be executed by an information processing device to be a subject of appliance registration in one or more servers, the method comprising:

acquiring identification information for identifying the information processing device;

transmitting an appliance registration request to the one or more servers, the appliance registration request being for the appliance registration in the one or more servers to associate the acquired identification information with tenant information for identifying a tenant;

receiving a setting request from a device for installing an application and writing a setting;

installing the application in the information processing device based on the setting request;

determining whether the installed application is a native application or a Web application based on the setting request upon the installing of the application;

acquiring a setting value for the native application from a setting file of object data of the native application in a case of the installed application determined as being the native application among a plurality of applications;

acquiring a setting value for the Web application from the one or more servers providing the function of the Web application via a network in a case of the installed application determined as being the Web application among the plurality of applications;

writing, to a storage, the setting value for the application acquired.

* * * * *